United States Patent
Xu et al.

(10) Patent No.: US 10,367,746 B2
(45) Date of Patent: Jul. 30, 2019

(54) STATISTICAL TRAFFIC CLASSIFICATION WITH ADAPTIVE BOUNDARIES IN A BROADBAND DATA COMMUNICATIONS NETWORK

(71) Applicant: Hughes Network Systems, LLC, Germantown, MD (US)

(72) Inventors: Jun Xu, Boyds, MD (US); Robert Torres, New Market, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/859,386

(22) Filed: Dec. 30, 2017

(65) Prior Publication Data
US 2019/0207858 A1    Jul. 4, 2019

(51) Int. Cl.
*H04L 12/851* (2013.01)
(52) U.S. Cl.
CPC .................... *H04L 47/2441* (2013.01)
(58) Field of Classification Search
CPC . H04L 12/24; H04L 12/2441; H04L 12/2483; H04L 12/26; H04L 12/56; H04L 12/725; H04L 12/851; H04L 12/825; H04L 29/06; G06F 15/173; H04W 28/06; H04W 52/02
See application file for complete search history.

(56) References Cited

U.S. PATENT DOCUMENTS

| | | | |
|---|---|---|---|
| 7,660,248 B1 * | 2/2010 | Duffield | H04L 41/142 370/229 |
| 7,720,013 B1 * | 5/2010 | Kelliher | H04L 43/00 370/202 |
| 2005/0060295 A1 | 3/2005 | Gould et al. | |
| 2007/0076606 A1 * | 4/2007 | Olesinski | H04L 41/0893 370/230 |
| 2009/0086651 A1 | 4/2009 | Luft et al. | |
| 2009/0141634 A1 * | 6/2009 | Rothstein | H04L 47/10 370/236 |
| 2009/0175194 A1 * | 7/2009 | Akhter | H04L 41/0803 370/254 |

(Continued)

FOREIGN PATENT DOCUMENTS

EP    1764951 A1 *  3/2007

OTHER PUBLICATIONS

USPTO, "International Search Report and Written Opinion", PCT/US20181067431, Mar. 22, 2019.

*Primary Examiner* — Afsar M Qureshi
(74) *Attorney, Agent, or Firm* — Potomac Technology Law, LLC

(57) ABSTRACT

An approach for classification of a data traffic session over a data communications network is provided. A network device receives data packets of the data traffic session. The network device determines a plurality statistical factors that characterize the data traffic session based on the received data packets. The network device analyzes the determined statistical factors in relation to a plurality of classification variables, and classifies the data traffic session as being one of a plurality of session priority types based on the analysis, wherein each of a plurality of subsets of the classification variables delineates the plurality of session priority types over a continuum with respect to a corresponding one of the statistical factors.

18 Claims, 7 Drawing Sheets

(56) References Cited

U.S. PATENT DOCUMENTS

| | | | | |
|---|---|---|---|---|
| 2011/0093785 A1* | 4/2011 | Lee | ................ | H04L 41/22 |
| | | | | 715/736 |
| 2012/0284791 A1* | 11/2012 | Miller | ................ | G06F 21/554 |
| | | | | 726/22 |
| 2013/0083806 A1* | 4/2013 | Suarez Fuentes | .. | H04L 41/0893 |
| | | | | 370/465 |
| 2013/0212265 A1* | 8/2013 | Rubio Vidales | ........ | H04L 12/14 |
| | | | | 709/224 |
| 2014/0064080 A1* | 3/2014 | Stevens | ............... | H04L 47/2441 |
| | | | | 370/235 |
| 2016/0359887 A1 | 12/2016 | Yadav et al. | | |
| 2017/0195450 A1* | 7/2017 | Su | ................ | H04L 65/4076 |

* cited by examiner

STATISTICAL TRAFFIC CLASSIFICATION WITH ADAPTIVE BOUNDARIES IN A BROADBAND DATA COMMUNICATIONS NETWORK

BACKGROUND

Data traffic demands and requirements within broadband data communications networks (such as the Internet) are increasing exponentially, and such increases present unique challenges in the associated networking protocols. In order to support such increasing data traffic demands, the network must provide efficient, robust, reliable and flexible services that satisfy the quality of service (QoS) requirements of the underlying applications and services. Further, such network data traffic (e.g., Internet data traffic) involves an increasingly high variety and complexity of data traffic types, such as voice over IP (VOIP), video streaming, interactive data (e.g., web browsing), etc. Such varieties of network data traffic also introduce varied respective functionality and transmission requirements, such as assured latency, minimum throughput levels, security, reliability, privacy, etc. In order to prioritize and satisfy such respective functionality and transmission requirements for the different data types, service provider networks must classify the data transmitted over a network as being associated with the respective data type or service/application type. The network can thereby handle the data of the different classifications appropriately to ensure that the respective functionality and transmission requirements are satisfied (e.g., the required QoS can be preserved for the different traffic types), without applying higher quality levels to data types that do not require such quality levels and thereby providing for efficient use of network resources and maximizing overall network data capacity levels.

Current traffic classification approaches can be basically grouped into three categories: (1) identification of a flow based on IP addresses and port numbers (plus protocol if needed); (2) deep packet inspection (DPI); and (3) inference based on statistics or artificial intelligence. Utilizing the IP and port number classification approach (1) does not necessarily provide for accurate data identification, because the same port may be used for two different data types or classes of data that entail different transmission requirements (e.g., the same port number may be used for web browsing data and video streaming data). For example, port 443 can be used for secure web browsing or secure video download. Further, the DPI approach (2) becomes very limited as the content of more and more Internet data traffic is secured, for example, based on SSL (secured socket layer), IPSec, etc., because the secured data cannot be inspected.

The inference approach (3) is limited based on user behavior and protocols defined by the service providers, which tend to be subjective and time varying leading to only temporarily independent approaches. More generally, a statistical classification method has merit in the sense that it only needs to focus on measurable metrics, such as throughput rate, packet size, session duration, inter-arrival time, etc. The statistical method, however, is still "blind," resulting in less accurate performance without certain assistance by the network. Further, the common statistical method is also subject to changes in traffic patterns of service provider networks. Accordingly, there are no current statistical approaches that can provide key classification functions with sufficient accuracy.

What is needed, therefore, is an efficient and accurate approach for data traffic classification in broadband data communications networks.

SOME EXAMPLE EMBODIMENTS

The present invention advantageously addresses the foregoing requirements and needs, as well as others, by providing a data traffic classification approach, which employs a rule-based statistical classification method that can be adaptively tuned according to network conditions.

In accordance with example embodiments of the present invention, a method is provided for classification of a data traffic session over a data communications network. A network device of the data communications network receives a plurality of data packets of the data traffic session. The network device determines a plurality of statistical factors that characterize the data traffic session based on the received data packets of the data traffic session. The network device analyzes the determined statistical factors for the data traffic session in relation to a plurality of classification variables. The network device classifies the data traffic session as being one of a plurality of session priority types based on the analysis of the determined statistical factors for the data traffic session in relation to the plurality of classification variables. Wherein each of a plurality of subsets of the classification variables delineates the plurality of session priority types over a continuum with respect to a corresponding one of the statistical factors.

In accordance with example embodiments of the present invention, a network apparatus is provided for classification of a data traffic session over a data communications network. The network apparatus comprises a receiver configured to receive a plurality of data packets of the data traffic session. The network apparatus further comprises a processor configured to (i) determine a plurality of statistical factors that characterize the data traffic session based on the received data packets of the data traffic session, (ii) analyze the determined statistical factors for the data traffic session in relation to a plurality of classification variables, and (iii) classify the data traffic session as being one of a plurality of session priority types based on the analysis of the determined statistical factors for the data traffic session in relation to the plurality of classification variables. Wherein each of a plurality of subsets of the classification variables delineates the plurality of session priority types over a continuum with respect to a corresponding one of the statistical factors.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
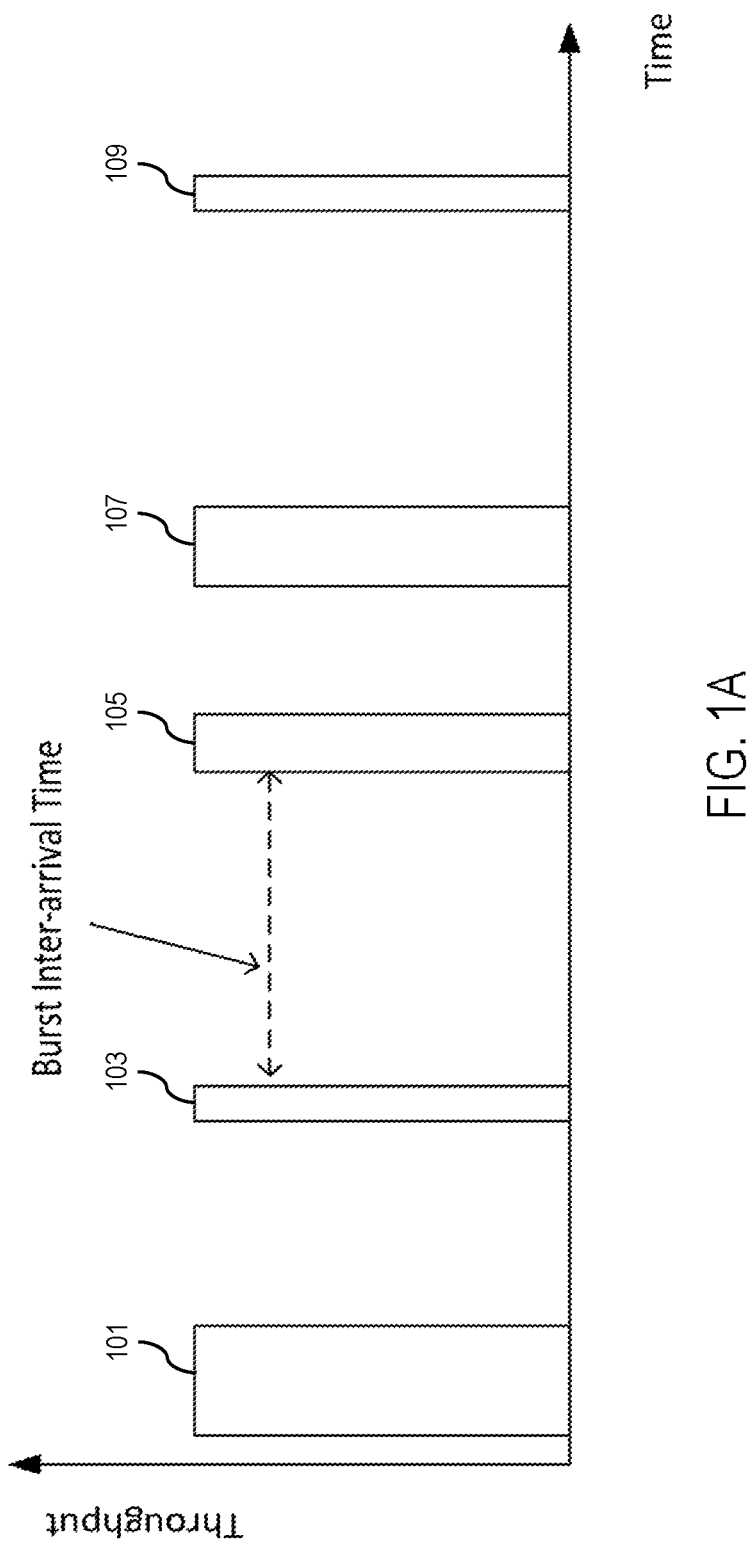
FIG. 1A illustrates a pattern of data bursts received by the client terminal or web browser for an example web browsing session, in accordance with example embodiments of the present invention.

A system and method for session data traffic classification in a broadband data communications network, which employs a rule-based statistical classification method that can be adaptively tuned according to network conditions, are provided. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

In accordance with example embodiments, novel and innovative approaches for rule-based statistical data traffic classification are provided, where the classification can be adaptively tuned according to network conditions. According to such approaches, a data traffic flow or session may be uniquely identified and characterized by a combination of factors, such as IP addresses, port numbers and protocol type, as well as a session ID (e.g., an n-tuple session ID, such as a 5 or 6 tuple session ID). Additionally, statistical metrics for the data session may also be used to characterize a session, which metrics may include average throughput rate, maximum throughput rate, session duration, the ratio of active and idle durations, etc.—where such statistical metrics form or reflect a session profile that is timely measured and determined. According to such example embodiments, such metrics are not limited to the foregoing statistical metrics, and (as would be recognized by one of ordinary skill in the art) would extend to or also include any metrics or factors that may be obtained, measured or otherwise determined and that would assist in an accurate characterization of the data traffic of a respective data session or flow.

In further accordance with such example embodiments, boundaries on the statistical metrics may be introduced to partition the data traffic of different sessions into different data or session classes—e.g., of differing priority levels. By way of example, an Internet session, characterized by its profile (e.g., statistical metrics), can be considered as a point in a multi-dimensional domain, uniquely located within certain boundaries, where the boundaries segment the Internet traffic into different classes, and thus a session may fall in a certain class based on its position in the multi-dimensional domain. Further, due to the dynamic feature of the statistical profile of a session, a session point far away from the boundary is more likely to be of one certain class compared to a point around the boundary which has higher uncertainty.

In accordance with further example embodiments, the boundaries can be adaptively adjusted based on network conditions. By way of example, network resources can be assigned to three traffic classes: Interactive, Streaming and Bulk, with a certain amount of bandwidth being reserved for each class. Then, with the arrival of more Interactive traffic, the utilization of the reserved bandwidth for the Interactive increases, and the respective boundary can be dynamically restricted or limited to allow fewer sessions being classified as Interactive. Subsequently, when the Interactive traffic levels decrease, the corresponding utilization of the Interactive bandwidth decreases, and the respective boundary can be relaxed or expanded to accommodate more sessions being classified as Interactive. In this manner, traffic flows classified well inside the boundaries have a higher probability of being prioritized, whereas, flows near the boundary may be classified in higher or lower priority classes subject to the network conditions. Accordingly, such approaches achieve statistical traffic classification that is dynamically adaptive based on network conditions.

A data traffic session may consist of a particular data communications session, for example, between a remote client terminal and a hub data node or server node, over a wide are broadband communications network, such as a wide area network implemented over one or more of a satellite network, wired or fiber terrestrial network, or wireless terrestrial (e.g., cellular) network, or any other such communications platform for carrying or transferring data over network links between one or more network nodes (e.g., terminals, gateways, routers, etc.). Such a data traffic session may involve a particular communications session for a particular terminal/client application or client service, such as a specific video or other media streaming session, a specific user Internet browsing session, a specific on-line user session (e.g., an on-line banking, ecommerce, or other commercial session or transaction), etc. A traffic data session further may be carried or communicated via any of various different data communications protocols, such as Transmission Control Protocol over Internet Protocol (TCP/IP), User Datagram Protocol over IP (UDP/IP), etc., and may also involve other information systems session protocols such as Hypertext Transfer Protocol (HTTP) or Hypertext Transfer Protocol Secure (HTTPS). Moreover, as would be apparent to one of ordinary skill in the art, the concepts of the example embodiments of the present invention are equally applicable to any such data traffic sessions irrespective of the particular protocols employed.

According to one such embodiment, the traffic classification approach employs algorithms for inner and outer classification loops. The inner loop employs a rule-based algorithm that measures the profile of a data session and determines the class in which the session is located based on boundary variables. The outer loop employs an algorithm whereby the boundary variables are dynamically adjusted based on the actual traffic volume of a certain class and the utilization of the respective reserved bandwidth for that class. This dual loop approach facilitates the classification of an amount of data traffic to a certain high priority class for the corresponding bandwidth reserved for that class, ensuring satisfactory QoS provisioning. The adaptive feature assures the relatively more desired flows are classified into higher priority even during the network congestion.

According to such example embodiments, the provided statistical method applies statistical metrics to capture the intrinsic characteristics of a traffic flow as the inner loop. It uses the decision feedback obtained by the network, such as congestion and network usage to dynamically drive the decision variables. The provided approach applies an inner and an outer loop, facilitating autonomous decisions on an individual session in the inner loop, while the outer loop adapts the classification process based on current network conditions. Compared to current statistical traffic classification approaches, the dual-loop approach according to example embodiments provides an innovative classification process that bridges the advantages of a theoretical statistical method with dynamic adaptation to address practical network conditions, providing a novel, innovative and comprehensive traffic classification solution to address expanding network data traffic requirements.

The data traffic classification approaches according to example embodiments of the present invention are applicable to any data communications network where traffic classification is necessary or advantageous for QoS provisioning within the network, such as a terrestrial network based on fiber or other wired technologies, a terrestrial wireless network (e.g., a 3G, 4G or 5G cellular network), and a satellite network (including both the inroute or return direction channels from remote user terminals back to gateway terminals and the outroute or forward direction channels from the gateway terminals out to the remote user terminals.

Based on the example of secure hypertext transfer protocol (HTTPS), the following provides an introduction for the data traffic classification approaches of example embodiments of the present invention. HTTPS is an adaptation of the hypertext transfer protocol (HTTP) for secure communications over a computer or data communications network, such as the Internet. In HTTPS, the data of the HTTP protocol is encrypted based on transport layer security (TLS) or secure sockets layer (SSL)—SSL is the predecessor to TLS. In other words, the HTTPS protocol consists of the application of the HTTP protocol over a secured connection (e.g., a transmission control protocol (TCP) connection). HTTPS has become extremely prevalent for conventional secured financial transactions over the Internet (such as online banking, stock, point of sale (POS) and ecommerce transactions), and also for privacy of the data for other applications (such as Facebook and YouTube). Typically, HTTPS data sessions over TCP connections (e.g., over the Internet) use port 443. As a result, data traffic for financial services and secure data streaming applications may both use port 443, and if the port is the only criteria used to classify the data of such sessions to a higher priority class, then on-going video flows may slow down the higher priority financial service sessions, especially when the network is congested. Accordingly, for improved network efficiency and to ensure that respective QoS requirements are satisfied for the different session types, the accuracy of the traffic classification must be improved to differentiate between the different session types (such as differentiation between the data of media streaming sessions and the data of online financial transaction sessions.

As introduced above, as a part of the traffic classification approaches of example embodiments, the intrinsic characteristics of different types of data sessions or traffic flows are captured based on statistical metrics. For example, the following provides an analysis of traffic characteristics of web browsing and video streaming sessions. FIG. 1A shows a pattern of data bursts received by the client terminal or web browser for an example web browsing session. With reference to FIG. 1A, the traffic bursts 101, 103, 105, 107, 109 exhibit random inter-arrival times, where each data burst reflects a group of data packets of a webpage content with smaller inter-arrival gaps between the individual packets relative to the burst-level inter-arrival times between requested webpage objects. For example, a user sends an HTTP request for downloading the data of a webpage, and then a group of data packets or burst 101 reflecting the content of the webpage arrive from the server in response to the request. The user may then send subsequent HTTP requests for further webpages, and the server responds to each further request with the data packets or burst 103, 105, 107, 109 for the content of each further webpage, respectively. Within the webpage content, timing gaps may occur between the arrival of the data packets of the same requested HTTP subject, which gaps are generally due to network behaviors as a result of protocols and network round trip time (RTT). On the other hand, the gaps between the traffic bursts (e.g., between the groups of data packets of different webpage objects) generally vary as a result of the user actions or behavior, and thus such burst inter-arrival times may be random and of significantly larger duration as they result from human factors.

Figure 1B:
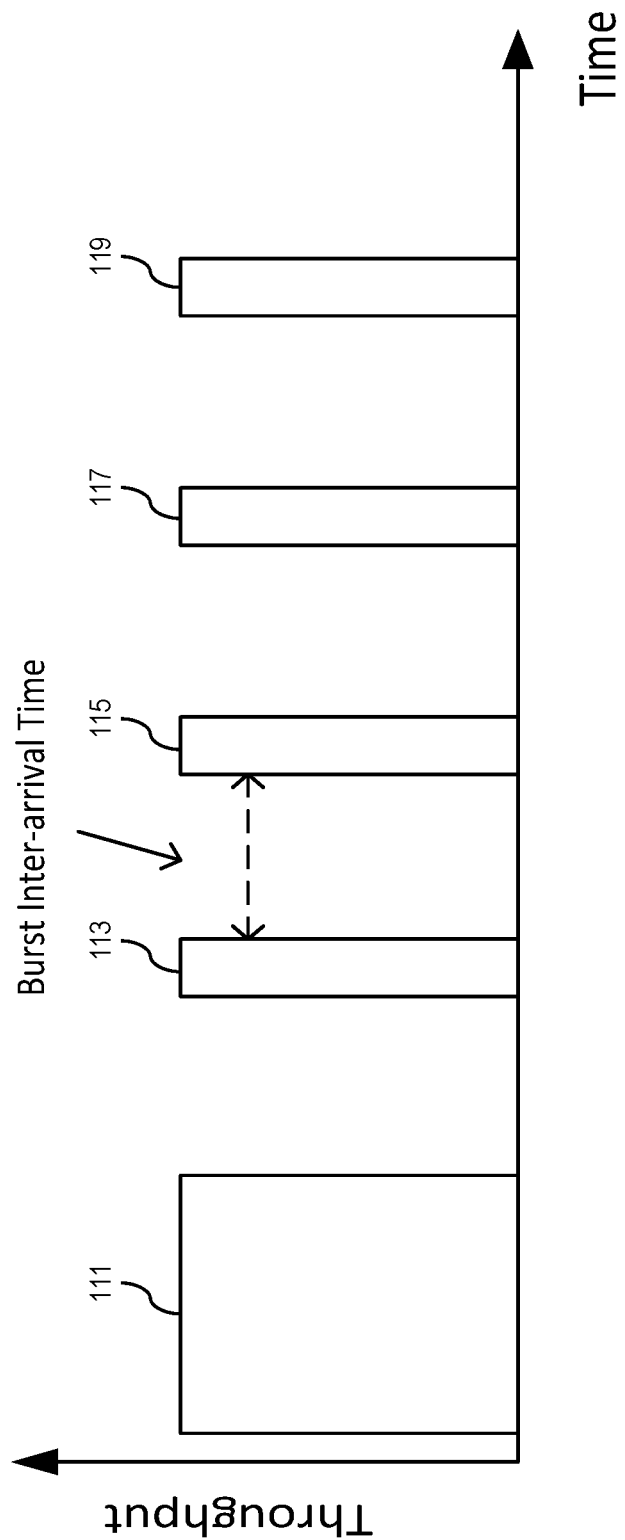
FIG. 1B illustrates a pattern of an example video streaming session of light data bursts with near constant inter-arrival times for a standard definition (SD) video data stream, in accordance with example embodiments of the present invention.
Figure 1C:
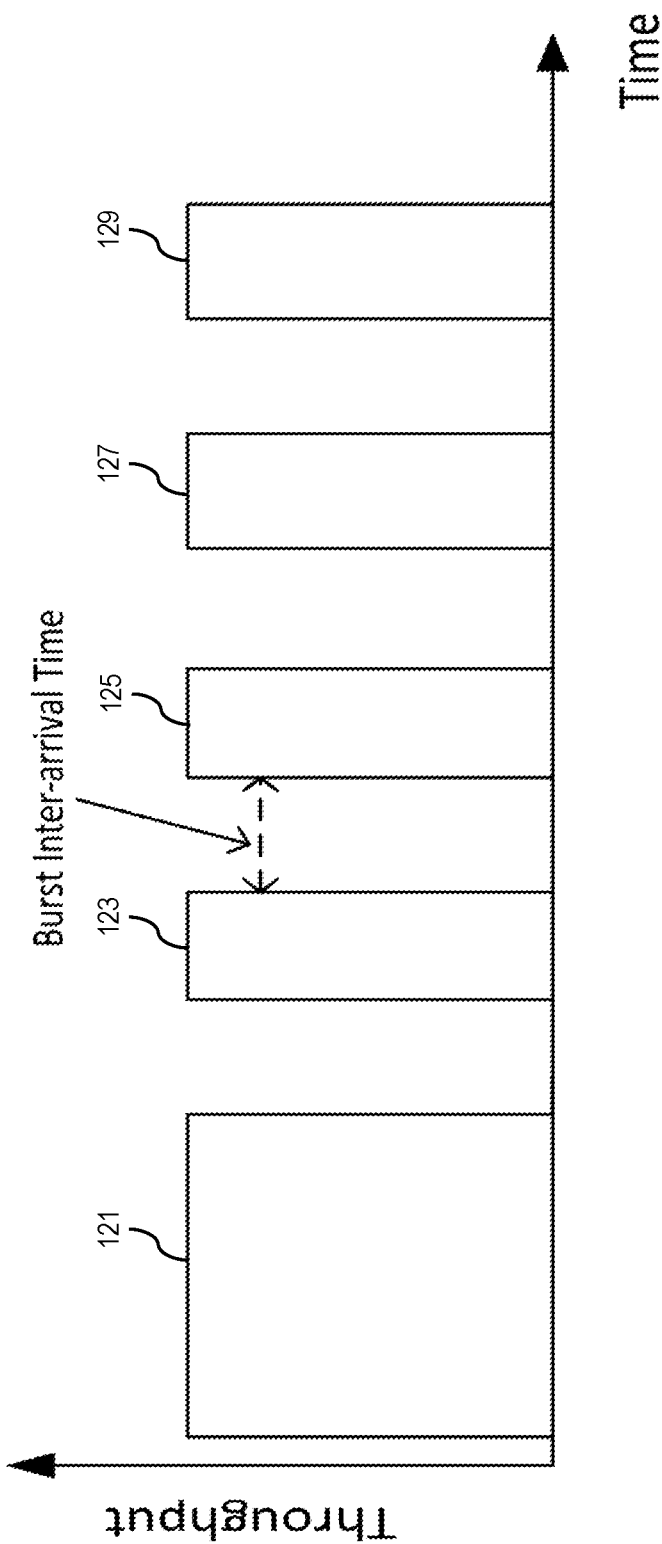
FIG. 1C illustrates a pattern of an example video streaming session of heavy data bursts with near constant inter-arrival times for a high definition (HD) video data stream, in accordance with example embodiments of the present invention.

FIGS. 1B and 1C show patterns of example video streaming sessions, where FIG. 1B shows a pattern of light data bursts with near constant inter-arrival times for a standard definition (SD) video data stream and FIG. 1C shows a pattern of heavy data bursts with near constant inter-arrival times for a high definition (HD) video data stream. At the user side, a user agent (e.g., the video player) sends an HTTP request to the server for the desired video content. In response, the server sends a data burst to fill the buffer of the video player. Initially, the video player usually requests a large burst 111 to fill its data buffer to a certain threshold, and subsequently requests smaller bursts 113, 115, 117, 119 to keep the buffer at the threshold. Since a video stream plays at a constant rate, and the video block in per HTTP request is of the same size, the data bursts will generally arrive at a constant time interval, as shown in FIG. 1B. For a high definition video, as shown in FIG. 1C, the size of the initial burst 121 and of each subsequent burst 123, 125, 127, 129 may each be respectively larger than in FIG. 1B, but the burst inter-arrival gap would still be nearly constant.

Based on the foregoing examples of data traffic behavior, the characteristics of web browsing and video streaming can be captured. First, the short term and long term throughput rate for each session can be captured. Further, a session can be uniquely identified by associated IP addresses and port numbers, etc. Additionally, the session duration can also be tracked based on certain criteria. For example, the session duration can be defined as viewing one webpage or one video, where the web browsing could have multiple sessions (one for each webpage requested/viewed), even with each session having the same the IP addresses and port numbers, while the viewing of each video reflects a single session.

Further, a configurable threshold for burst inter-arrival times can be defined, whereby, if the burst inter-arrival time is less than the threshold, the session continues, and otherwise, the session is finished. For example, the threshold may be defined as a short duration—such that the relative short durations within the content of a particular webpage of a web browsing session would not exceed the threshold, and the random interval between page requests would have a higher likelihood of exceeding the threshold, and the duration of a video streaming session could continue without the burst inter-arrival time exceeding the threshold.

Figure 2:
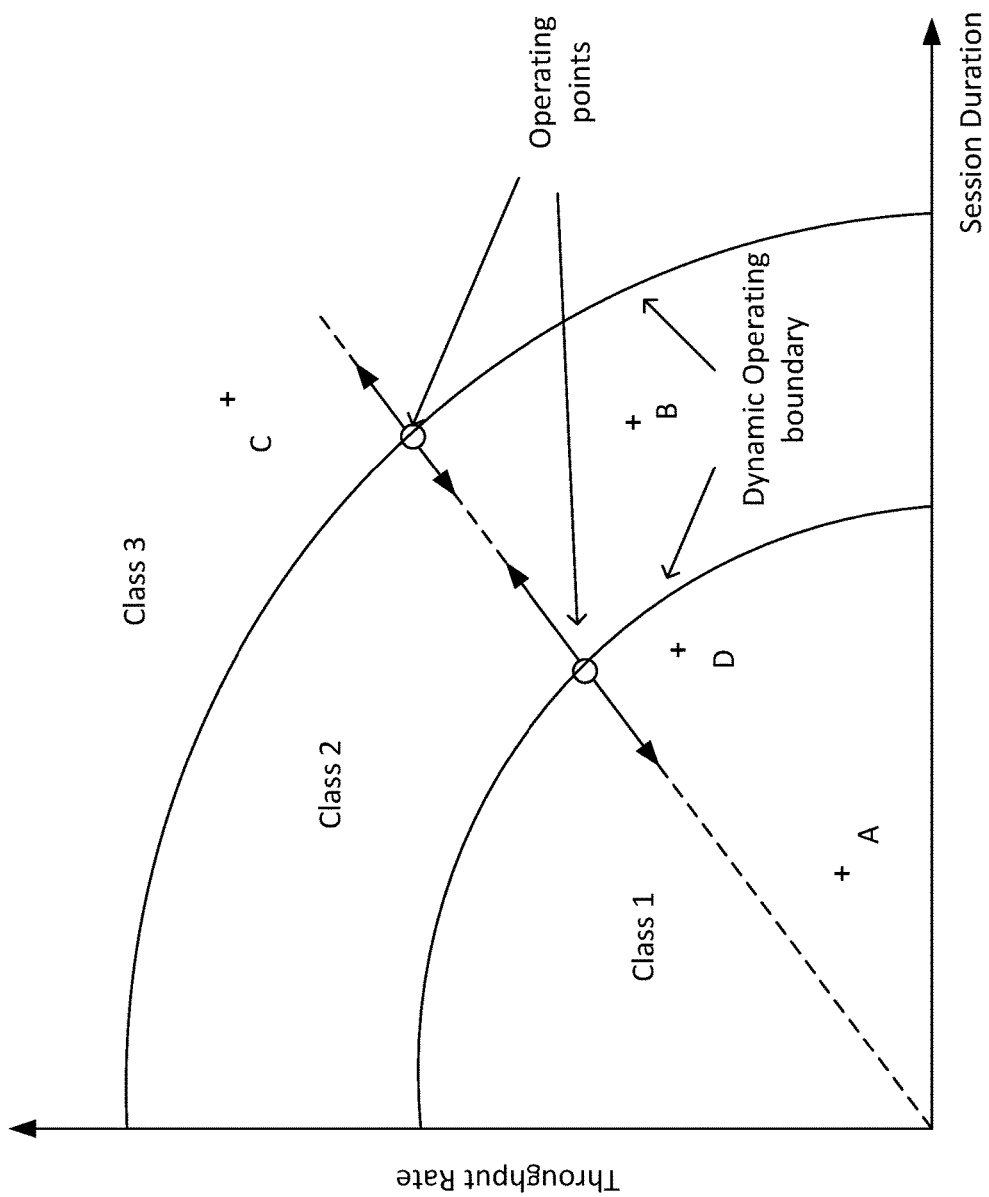
FIG. 2 illustrates a chart depicting a data traffic classification approach, where a traffic session is characterized by factors such as its throughput rate and session duration and is mapped in a two dimensional domain, in accordance with example embodiments of the present invention.

Then, according to an example embodiment, where a session is characterized by factors such as its throughput rate and session duration, the session is mapped in a two dimensional domain (as shown in FIG. 2), illustrating a traffic classification approach in accordance with example embodiments.

At a certain time snap shot, a web browsing session (e.g., as shown in FIG. 1A) may be represented by point A, a low definition video (e.g., as shown in FIG. 1B) may be represented by point B and a high definition video (e.g., as shown in FIG. 1C) may be represented by point C. Further, often a web browsing could involve video, like a news feed or video feed, where such video-based web browsing may be represented by point D. In practice, many sessions may be characterized as sample points in the two dimensional domain. Then, dynamic boundaries are used to separate the sample points such that each sample set is reserved a certain amount of bandwidth. As shown in FIG. 2, two boundaries are defined, and a session is either in Class 1, Class 2 or Class 3, where each class refers to the area encircled by the respective operating boundaries. If a session sample falls in one area, it is classified into the corresponding traffic type, e.g., the session reflected by points A and D are classified into the Class 1, the session reflected by the point B is classified into the Class 2 and the session reflected by the point C is classified into the Class C. Further, in accordance with such example embodiments, the boundaries can be dynamically adjusted. For example, if there are a lot of samples in the Class 1 area, making the bandwidth usage more than the corresponding reserved share, then the boundary for Class 1 can be shifted down such that the encircled Class 1 area becomes smaller, resulting in a smaller usage of bandwidth. As the boundary moves down, samples originally being classified into the Class 1 would effectively be shifted into the Class 2 area, whereby the respective session classification would be adjusted from Class 1 to Class 2.

With reference to FIG. 2, for example, supposing the point A represents an online banking session and the point D represents a video news session. The point A is characterized close to the origin while the point D close to the class boundary. When network usage for the Class 1 data is less than a threshold, the points A and D may be classified in the same class (i.e., the same priority). Then, if the network usage for Class 1 data increases due to more sessions like the point A session, then the boundary is shifted down, excluding the point D (and perhaps other similarly situated sessions) from the Class 1 and shifting the respective session(s) to the Class 2. The quality of service (QoS) requirements for the higher priority sessions (closer to the origin) can thereby be assured.

It should be noted that, because the statistical characteristics of traffic sessions may vary drastically, estimation errors can occur—e.g., where a video session is characterized as a browsing session and vice versa. In majority cases, however, web browsing is light data traffic compared to video data traffic, and the session duration can be characterized as short lived using the respective criteria, and thus samples for web browsing sessions are likely be characterized or represented as being closer to the origin. Adaptively or dynamically adjusting classification boundaries thereby helps to retain the QoS for higher priority data traffic (data sessions) in view of the respective reserved bandwidth, achieving the intended purpose of traffic classification. Shifting the boundary lines can be based on calculating the operating points (e.g., as shown in FIG. 2) based on the network conditions, and dynamically shifting such boundaries can accommodate for varying network conditions over time.

Figure 3:
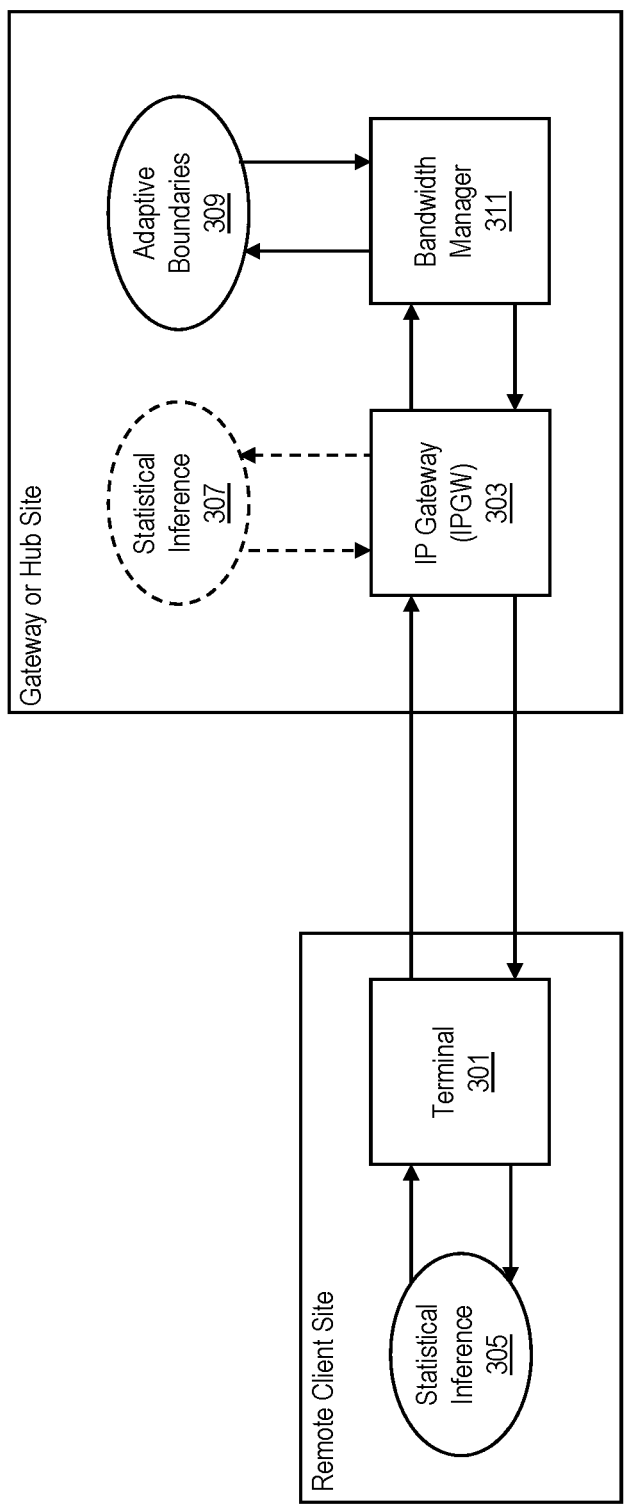
FIG. 3 illustrates a block diagram depicting an example system model for a data traffic classification approach, in accordance with example embodiments of the present invention.

FIG. 3 illustrates a block diagram depicting an example system model for a data traffic classification approach, in accordance with example embodiments. In this model, an Internet session is established between the terminal and the IP Gateway (IPGW). A terminal can have multiple traffic sessions running concurrently, and the respective IPGW manages all traffic sessions of the terminals it is associated with or connected to. The traffic classification for each session can be performed either at the terminal or the IPGW (but not both)—hence, FIG. 3 shows the Statistical Inference process/processor 305 of the terminal 301 in solid lines and the alternate Statistical Inference process/processor 307 of the IPGW in dashed lines. According to such example embodiments, data traffic for each session is evaluated and a respective profile is determined by the Statistical Inference process/processor 305/307. Once the traffic profile for the data of a session is determined, the session is classified based on its location within the classification boundaries and the node that performs the classification determination (the terminal or the IPGW) notifies the other node (the IPGW or terminal) of the determined classification for the traffic session and the session is handled based on the associated priority. By way of example, at startup, the Statistical Inference begins the process utilizing default classification boundaries (the Adaptive Boundaries 309), which may be predetermined based on current network conditions and bandwidth allocation to the respective traffic classes. Then, in operation, as the network traffic conditions change, the adaptive boundaries 309 may be adjusted or shifted by the Bandwidth Manger (BM) 311. By way of example, the Bandwidth Manger monitors the network utilization of each traffic class and dynamically adjusts the adaptive boundaries as network conditions change and bandwidth utilization shifts amongst the respective traffic classes. Such adaptation thereby ensures that the required volume for certain traffic classes (e.g., higher priority classes) can be satisfied by the respective reserved network resources or bandwidth. Accordingly, the approach of such example embodiments generally comprises the two key functions of a statistical inference for traffic session classification decision criteria and an adaptation function for dynamically adjusting the classification boundaries of the decision criteria.

According to certain example embodiments, Internet data traffic is partitioned into a few types—where two broad types can be characterized as real-time (RT) and non-real-time (NRT) data traffic classes. By way of example, RT traffic consists of voice conversation session data, video conversation session data and data of similar priority requirements (e.g., with respect to jitter and latency)—which data traffic requires a relatively high priority with guaranteed bandwidth. By way of further example, a typical classification of NRT data traffic may include the three data traffic types, Interactive, Streaming and Bulk. The Interactive class, for example, comprises data traffic that involves interactive exchanges between both the sender and receiver sides (e.g., the client and server endpoints), which is generally delay sensitive—such as web browsing data traffic, online gaming data traffic, online banking data traffic, e-commerce data traffic, etc. The streaming class, for example, generally comprises media streaming services—such as video streaming, news feeds, etc. The Bulk class, for example, generally comprises file uploading or downloading (e.g., data backup services, software update services, etc.). Such classification facilitates the satisfaction of the data traffic requirements of the different traffic classes (e.g., considering that the traffic demands of the different classes vary dynamically and can instantaneously be higher than the available bandwidth). As such, for example, high priority data traffic (e.g., Interactive) should be served first to minimize the incurred latency, whereas Bulk data traffic is generally delay tolerable. Further, while Streaming data traffic imposes delay and jitter requirements, the media devices or applications that present the media content typically employ buffers to control the playback, and thus the latency requirements for Streaming data traffic are lower than for Interactive data traffic but higher than for Bulk data traffic (because the buffers must be kept at a fill level to enable steady playback).

In accordance with example embodiments, a traffic classification scheme can employ various approaches including both deterministic and statistical methods or processes.

According to example embodiments, the deterministic aspect may consist of the determination and assignment of a unique Traffic Session ID for each data traffic session—whereby a unique data sequence is determined and assigned for each data traffic session. The Traffic Session ID, determined by the classification process for purposes of data session classification, shall hereinafter be referred to as the Session-Tuple. By way of example, the Session-Tuple may be the six-tuple term {Source IP, Destination IP, Source port number, Destination port number, Protocol type and a Session ID (SID)}. The SID can be derived from an HTTP/HTTPS session (within the HTTP/HTTPS protocol, each session is assigned a unique sequence (SID) to identify the session), or can be based on other protocols if an intrinsic unique session ID is available—otherwise, with a non-HTTP/HTTPS session without a session ID, the terminal/gateway may assign a unique SID as part of the Session-Tuple determination. According to the deterministic aspect of the traffic classification, the Session-Tuple is first determined for a data traffic session, and then a determination is made as to whether any terms or components of the Session-Tuple matches any of one or more preconfigured Session-Tuples, each associated with a respective data class—the data session is classified as being of the class of any such matching preconfigured Session-Tuple. For example, if the corresponding terms of the Session-Tuple determined for a given traffic session match the pre-determined source and/or destination IP addresses of a preconfigured Session-Tuple associated with a particular traffic class, then the traffic session may be classified as being in that associated traffic class.

The following Table 1 defines the six-tuple Session ID.

TABLE 1

| Six-Tuple Session Identifier (Session ID) | | |
|---|---|---|
| Notation | Name | Determination |
| Session_ID | ID number of the session | Derived from the session or assigned |

TABLE 1-continued

| Six-Tuple Session Identifier (Session ID) | | |
|---|---|---|
| Notation | Name | Determination |
| Source_IP | IP address of the source | Derived from the session |
| Destination_IP | IP address of the destination | Derived from the session |
| Source_port | Port number of the source | Derived from the session |
| Destination_port | Port number of the destination | Derived from the session |
| Protocol_type | Protocol type | Derived from the session |

Further, with regard to the terminology "source" and "destination," for a given data direction, the "source" refers to the sending side and the "destination" refers to the receiving side—so for the forward link (the link or connection for data transfer from the gateway/hub or server to the remote terminal or client device), the gateway/hub or server is the "source" and the remote terminal or client device is the "destination," and for the return link (the link or connection for data transfer from the remote terminal or client device to the gateway/hub or server), the remote terminal or client device is the "source" and the gateway/hub or server is the "destination." Additionally, because a variety of protocols are employed for Internet data sessions, identification of the protocol type (while not necessarily required) is beneficial in defining the Session ID and data session.

According to further example embodiments, the statistical aspect of a data session classification approach may include the determination of a profile for each data traffic session, and the classification of each session based on the respective determined profile. According to such embodiments, the profile for a data traffic session consists of a series of factors (e.g., statistical factors) that characterize the session data. According to one such embodiment, the session profile comprises the six statistical characteristic metrics of Average Throughput, Session Duration, ON-OFF Duration, ON-OFF Ratio and Maximum Throughput Rate (or more simply referred to as Maximum Rate). The Average Throughput is the throughput rate from the start of the session to the time it is measured. The Session Duration is the duration from the start of the session to the time it is measured. The ON duration is the accumulated time (e.g., over the Session Duration) when data is present for the session, and the OFF duration is the accumulated time (e.g., over the Session Duration) when data is not present for the session. The ON-OFF Ratio is the ratio of the ON and OFF durations. The Maximum Throughput Rate is the highest rate measured during a certain sampling period of a session. Accordingly, at any given point in time, the profile for a data traffic session can be determined by measuring and determining the series of factors to characterize the data traffic—which in this example comprise the foregoing six statistical characteristic metrics of Average Throughput, Session Duration, ON-OFF Duration, ON-OFF Ratio and Maximum Throughput Rate. Then, based on predetermined boundaries set for the different traffic classes employed for the classification process (e.g., Interactive, Streaming and Bulk)—for example, where the boundaries are set based on respective thresholds for the statistical characteristics—each data traffic session can be classified according to where the profile falls in relation to the classification boundaries. By way of example, the following Table 2 delineates common characteristics of the statistical metrics for each traffic class (using the example Interactive, Streaming and Bulk traffic classes), which apply to either the forward link or return link data traffic directions. The statistical metrics can be captured/determined for both the return and forward link directions for a given traffic session (e.g., the statistical metric determination can be performed at the terminal for the return direction and at either the terminal or gateway for the forward direction.

TABLE 2

Characteristics of traffic profile on Either Forward or Return Direction

| Type | Average Throughput | Session Duration | ON-OFF Duration | ON-OFF Ratio | Maximum Rate |
|---|---|---|---|---|---|
| Interactive | Low-mid | Short | Yes | Small | Low-mid |
| Streaming | Mid-high | Short-long | Yes | Small-mid | Low-mid |
| Bulk | Mid-high | Short-long | Yes | Large | Mid-high |

By way of example, as described above with reference to FIGS. 1A-1C, Interactive data traffic and Streaming data traffic can be characterized and classified based on the two primary statistical metrics of Average Throughput and Session Duration, and Bulk data traffic can be classified based on the two additional statistical metrics of ON-OFF Ratio and Maximum Throughput Rate. Multidimensional mapping can then be applied to classify data traffic sessions based on where the determined profile of a given session falls in relation to class boundaries in the multidimensional space. By way of further example, a feedback loop may be applied to adjust the boundaries between the data traffic classes based on the bandwidth usage of each class type. For example, assuming that 50% of the bandwidth is assigned to the Interactive traffic class, if the actual bandwidth utilization by the Interactive class is lower than the assigned 50%, then the boundary can be shifted to result in the classification of more data sessions as Interactive (e.g., the boundary thresholds for the Average Throughput or Session Duration can be increased)—alternatively, if the actual bandwidth utilization by the Interactive class increases above the assigned 50%, then the boundary can be shifted to result in the classification of fewer data sessions as Interactive (e.g., the boundary thresholds for the Average Throughput or Session Duration can be decreased).

With regard to classification based on data traffic directions, according to example embodiments, different approaches may be employed. Generally, for the return direction, the classification process may be performed at the terminal, whereas, for the forward direction, the classification process may be performed either at the terminal or at the gateway. Further, by way of example, the traffic classification may be determined for one direction, and then the same classification may be applied in the return direction for the same traffic session. Such an approach may, however, not apply from a practical sense—for example, playing a video by a terminal may be classified as Streaming on the forward link, but the respective traffic pattern or profile of the return link would actually be Interactive (the forwarding/streaming of the video content would follow a streaming profile, while the request or return direction would follow an interactive profile). Depending on network conditions, however, this inaccuracy may not be detrimental to the performance of the session. For increased accuracy (at the expense of some traffic classification overhead), as an alternative, the statistical classification process can be applied independently in both the forward and return directions.

According to example embodiments, for the determination of the Session-Tuple for a data traffic session, the SID is periodically checked and updated. As mentioned above, the SID can be derived from an HTTP/HTTPS session or can be based on other protocols if an intrinsic unique session ID is available, and otherwise, with a non-HTTP/HTTPS session without a session ID, the terminal/gateway may assign a unique SID as part of the Session-Tuple determination. For purposes hereof, an HTTP/HTTPS-derived session ID will be referred to as a SID and an otherwise assigned session ID will be referred to as an ASID.

By way of example, for the SID, at the time of each update (e.g., based on an update interval of $T_{SID}$), if the SID stays the same (even if an IP address or port number changes), the session remains the same with the same profile and classification. If a new SID is detected (even with same IP addresses and port numbers), then the data traffic is determined as a new session, and a new statistical profile is correspondingly evaluated and determined. A typical default value is for the SID update interval, for example, may be $T_{SID}$=15 seconds or $T_{SID}$=30 seconds.

By way of further example, for the ASID, an idle time-out is used to detect inactivity for updating the ASID. The interval for updating the ASID is denoted as $T_{ASID}$ (which, for example, may be around 150 seconds). Further, the average throughput rate $r_b$ is the average rate over an interval of $T_b$ seconds. Then, if for consecutive K intervals, $K \cdot b \geq T_{ASID}$, all $r_b$'s are smaller than a threshold, the session is inactive for at least $T_{ASID}$ seconds, and a new session is determined and a new ASID is assigned to the session. The ASID, however, need not necessarily have an absolute time-out—e.g., downloading a file can last a few hours, if there is no idle time-out, then the session duration grows.

Accordingly, for identifying a session based on the Session-Tuple profile, (i) if the session is based on an HTTP/HTTPS protocol, the derived SID drives the session—If the SID changes, then the session changes, whereas if the SID does not change but other attributes change, the session does not change, (ii) for non-HTTP/HTTPS sessions, since the ASID is assigned, all five components of the Session-Tuple determine the session—if any attribute changes, the session changes.

According to example embodiments, the determination of certain statistical metrics to characterize a data traffic session may be as follows.

Average Throughput:

$r_a$: $r_a = V_a/T_a$, $T_a$ second throughput rate in kpbs, where $V_a$ is the data traffic volume over the time period $T_a$ (e.g., $T_a$=0.2 seconds).

$r_b$: $r_b = V_b/T_b$, $T_b$ second throughput rate in kpbs, where $V_b$ is the data traffic volume over the time period $T_b$ (e.g., $T_a$=5.0 seconds).

$r_s$: $r_s = V_s/T_s$, session average throughput rate, the rate over the time until the most recent update, where $T_s$ seconds is the session duration until the most recent update and $V_s$ is the data traffic volume over the time period $T_s$. When implementing this, a long term timer (e.g., $T_{LT}$=30 seconds) is used to calculate the long term (LT) average rate—then, if the session duration is shorter than $T_{LT}$, then the session duration $T_s$ is used, otherwise, $T_{LT}$ is used—which means that the maximum time for the average throughput variable is $T_{LT}$.

Session Duration ($T_s$ seconds): The start of the session until the most recent state update. Three configuration parameters are used to determine the session duration: $R_{IN}$ (e.g., $R_{IN}$=50 kbps), $R_{OUT}$ (e.g., $R_{OUT}$=10 kbps), and $T_{session-Timeout}$ (e.g., $T_{session-Timeout}$=30 seconds), as follows:

If $r_a \geq R_{IN}$, then start to count $T_s$, and as long as $r_a \geq R_{OUT}$, continue $T_s$ count.

If $r_a < R_{OUT}$ for consecutive $T_{Session-Timeout}$, then end $T_s$ count.

ON Duration: Consecutive periods of $T_a$ such that $r_a$ is no less than a threshold. There can be multiple ON durations during a session. The threshold, denoted as $r_{th}$, is a portion of $r_s$, e.g., $r_{th} = \theta_s \cdot r_s$, where $\theta_s$ is a configured parameter (e.g., $\theta_s = 0.3$). ON duration is measured as follows:

By way of example, measurement of the ON Duration may be as follows:

Set $R_{LT\_th} = 15$ kbps, when $T_s > T_{s\_th}$ (when the session duration is greater than a threshold time, e.g., $T_{s\_th} = 15$ seconds), then start ON Duration count.

If $r_a > \theta_s \cdot r_s$ (e.g., 30% of LT rate), then count as ON time, and otherwise count as OFF time—so the ON-OFF time is valid only if the session duration is valid.

Set configuration parameter $T_{ONOFF\_max} = 60$ seconds, then for every $T_{ONOFF\_max}$ time period, the ON Ratio will be updated $T = \min[T_s, T_{ONOFF\_max}]$.

ON Duration=time duration when $r_a \geq \theta_s \cdot r_s$ in T.
ON Ratio=ON duration/T.
OFF Duration: The consecutive periods of $T_a$ that is not an ON period.
ON-OFF Ratio: The ratio of total ON periods and total ON and OFF periods.

$\rho = T_{ON}/(T_{ON} + T_{OFF})$ over the session duration $T_s$. If $T_{OFF} = 0$, then $\rho = \rho_{max} = 1$. Initially $\rho = 0$ and begins to be updated after a certain duration $T_\rho$ (e.g., $T_\rho = 30$ seconds).

Average ON Duration: The average of ON time over the session duration.

Average OFF Duration: The average of OFF time over the session duration.

Volume: The session data volume over the time period $T_b$ seconds (denoted as $A_b$ in Mbytes or Kbytes. It is measured every $T_b$ seconds for past $T_b$ duration. It is within a session, but is not restricted by the session duration, meaning the measurement is absolute. If this volume is larger than a threshold, the session is considered as Bulk.

According to further example embodiments, Classification Variables (CV) are defined to perform as the thresholds or adaptive boundaries for partitioning the continuum of data traffic session profiles (e.g., an n-dimensional space defined by the statistical metrics applied for classification of respective data traffic sessions) into the various traffic or session classes. As described above, the boundaries are adaptive in that the CVs may be dynamically adjusted to shift the boundaries and adjust the resulting session classifications based on changing network conditions and bandwidth utilization. By way of example CVs are defined for boundaries of a session's statistical profile, such as the Average Throughput, the Session Duration and the ON-OFF Ratio, as well as the threshold of network utilization and the maximum throughput. The following Table 3 provides the generic definition for different boundary Classification Variables.

TABLE 3

Boundary Classification Variables

| Notation | Parameter Name | Unit | Initial Value | Upper Limit | Lower Limit | Coefficient |
|---|---|---|---|---|---|---|
| $\{R_i\}$, i = 1, ..., M − 1, M, being the number of classes | Boundaries of Average Throughput Rate for M classes | Kbps or Mbps | $\{R_i^{(0)}\}$ | $\{R_i^{max}\}$ | $\{R_i^{min}\}$ | $\{a_i\}$ with initial value 1.0; M − 1 values among M classes, representing Interactive, Streaming, Bulk, etc; M = 3. |
| $\{T_i\}$, i = 1, ..., M − 1, M, being the number of classes | Boundaries of session duration for M classes | sec or ms | $\{T_i^{(0)}\}$ | $\{T_i^{max}\}$ | $\{T_i^{min}\}$ | $\{b_i\}$ with initial value 1.0 |
| $\{\rho_i\}$, i = 1, ..., M − 1, M, being the number of classes | Boundaries of ON-OFF Ratio for M classes | N/A | $\{\rho_i^{(0)}\}$ | $\{\rho_i^{max}\}$ | $\{\rho_i^{min}\}$ | $\{c_i\}$ with initial value 1.0 |
| $\{u_{i,TH}^{CRO}\}$, i = 1, ..., M − 1, M, being the number of classes | CRO utilization used for classification | N/A | Default values | N/A | N/A | Default values can be [0.5, 0.3, 0.2] for Interactive, Streaming, Bulk |
| $r_{max}$ | Maximum Rate to identify Bulk | Kbps or Mbps | | | | |
| $r_{RT}$ | Rate boundary for real-time (RT) like traffic | Kbps | | | | |

Further, considering the three classification types Interactive, Streaming, Bulk, to facilitate the below example algorithms, the following Table 4 illustrates the derivation of the specific Boundary Variables separating the traffic classes/types with respect to a corresponding statistical traffic metric based on the boundary classification variable definitions of Table 3 and the respective Boundary Coefficients determined from the Outer-Loop algorithm.

above, a statistical traffic profile is evaluated and determined for data traffic sessions, where the profile comprises certain statistical traffic metrics, such as average throughput, session duration, the ratio of active and idle durations, maximum throughput rate, etc., and a set of boundary variables are defined based on threshold profile metrics to partition the determined profiles amongst different session or traffic

TABLE 4

Boundary Variable Derivation for Algorithms

| Name | Classification Variable (initial default value) | Classification Variable (run-time value) | Comment |
|---|---|---|---|
| Boundary of Throughput for Interactive A | $R_{1A}$ | $R_{1A}$ | Tentatively not adaptive, however, coefficient may be added. |
| Boundary of Throughput for Interactive and Interactive B | $R_{1B} = R_1^{(0)}$ | $R_1(t) = a_1(t) \cdot R_1^{(0)}$ | Between Interactive (Class 1) and Streaming (Class 2). $R_1^{(0)}$ is the configured default and initial value. $R_1(t)$ is adaptive. If there are multiple subclasses in Class 1, then all subclasses are inclusive inside this boundary. |
| Boundary of Throughput for Streaming | $R_2^{(0)}$ | $R_2(t) = a_2(t) \cdot R_2^{(0)}$ | Between Streaming (Class 2) and Bulk (Class 3). $R_2(t)$ is adaptive. If there are multiple subclasses in Class 2, then all subclasses are inclusive in this boundary. |
| Boundary of Throughput between Bulk A (Interactive Bulk) and Bulk B (background Bulk) | $R_3^{(0)}$ | $R_3$ | Tentatively not adaptive, however, coefficient may be added. |
| Boundary of Session Duration for Interactive | $T_1^{(0)}$ | $T_1(t) = b_1(t) \cdot T_1^{(0)}$ | Between Interactive (Class 1) and Streaming (Class 2). $T_1^{(0)}$ is the configured default value. If there are multiple subclasses in Class 1, then all subclasses are inclusive in this boundary. |
| Boundary of Session Duration for Streaming | $T_2^{(0)}$ | $T_2(t) = b_2(t) \cdot T_2^{(0)}$ | Between Streaming (Class 2) and Bulk (Class 3). If there are multiple subclasses in Class 2, then all subclasses are inclusive in this boundary. |
| Boundary of Session Duration for Bulk A (Interactive Bulk) | $T_3^{(0)}$ | $T_3^{(0)}$ | Tentatively not adaptive, however, coefficient may be added. |
| Boundary of ON/OF ratio between Streaming and Bulk A | $\rho_2^{(0)}$ | $\rho_2(t) = c_2(t) \cdot \rho_2^{(0)}$ | Between Streaming (Class 2) and Bulk (Class 3). If there are multiple subclasses in Class 2, then all subclasses are inclusive in this boundary. |
| Boundary of ON/OF ratio between Bulk A and Bulk B | $\rho_3^{(0)}$ | $\rho_3^{(0)}$ | Tentatively not adaptive, however, coefficient may be added. |
| Boundary of Maximum Throughput | $R_{max}$ | $R_{max}$ | Tentatively not adaptive, however, coefficient may be added. Between Streaming and Bulk A. |

In accordance with example embodiments, the following describes example algorithms for a rule-based statistical classification scheme, with adaptive boundaries, for Internet data traffic sessions. In the following scheme, as described classes. If a session profile is located in a bordered area of a class, the session is classified as belonging to that class.

According to such example embodiments, two interconnected classification algorithms may be defined. By way of example, the first (referred to as the Inner-Loop algorithm) is a rule-based classification algorithm for determining the traffic type to which a session belongs based on run-time Classification Variables. By way of further example, the second (referred to as the Outer-Loop algorithm) is an algorithm for adaptively adjusting the boundary values of the run-time Classification Variables according to run-time updated network resource utilization metrics for of each traffic class. For purposes of the following algorithms, a four-tuple statistical profile is employed, including Average Throughput, Session Duration, ON-OFF Ratio and Maximum Throughput Rate. Initially, a session is considered as Interactive after the session connection is established or set up. As time goes on, its four-tuple profile is evaluated and updated during run-time. At any update interval, both the Inner-Loop and Outer-Loop algorithms run, where a session is classified based on its four-tuple traffic profile and the Classification Variables via the Inner-Loop algorithm, and the Classification Variables are updated based on the network resource utilization of each class via the Outer-Loop algorithm.

In a general sense, the Inner-Loop algorithm determines that data traffic profile for a session and determines in which class the session is located based on the boundary variables. In the Outer-Loop algorithm, the boundary variables are dynamically adjusted based on the actual traffic volume of each traffic class and the respective reserved bandwidth for the class. With this dual-loop scheme, a level of traffic is assigned to a respective priority class for the corresponding bandwidth reserved for that class, ensuring satisfactory quality of service (QoS) provisioning. Further, a session can be uniquely identified by the Session-Tuple identifier (e.g., the foregoing six-tuple Session ID).

According to example embodiments of the Inner-Loop algorithm (e.g., performed at the client terminal), the algorithm functions to determine whether a session should stay in the current class or be moved to another one, for example, where the move would be from a class of a higher priority to a class of a lower priority (e.g., to alleviate a congestion condition when the demand for bandwidth of the higher priority class approaches or reaches a point of exceeding the reserved bandwidth for that class). Further, the move may contemplate skipping one or more classes. The Inner-Loop algorithm is a rule-based approach.

According to one embodiment, the Inner-Loop algorithm is as follows. The inputs to the Inner-Loop algorithm comprise the Classification Variables (obtained by the outer loop algorithm) and a four-tuple characteristic profile to characterize a runtime session. By way of example, for the Classification Variables, every $T_c$ (in sec or ms), the boundary variables $r_{Stream}(t)$, $r_{Bulk}(t)$, $\rho_{Bulk}(t)$, $t_{Bulk}(t)$ are updated via the outer loop algorithm, and the four-tuple characteristic profile $\Phi^{(4)}=(r_s,T_s,\rho,r_b)$ is used to characterize a runtime session, where $r_s$ is the Average Throughput, $T_s$ is the Session Duration, $\rho$ is the ON-OFF Ratio, and $r_b$ is the maximum measured throughput rate.

The state variables in the four-tuple profile are updated periodically, as follows: (1) every $T_a$ (in seconds or milliseconds, e.g., with a default value of 1 second), the system updates the current throughput rate $T_s$; for the $T_a$ time period, the current ON time, the current OFF time and the session duration $T_s$; and (2) every $T_b$ (in seconds or milliseconds, e.g., with a default value of 5 seconds), the system updates maximum rate $r_b$ over the $T_b$ time period, the average throughput $r_s$ over the session duration $T_s$, and the ON-OFF Ratio $\rho$; where the maximum throughput rate $r_b$ may be considered as the peak rate.

The following Table 5 reflects the boundary variables used in the Inner-Loop algorithm in relation to the traffic classes Interactive A, Interactive B, Streaming, Bulk A and Bulk B (Background Bulk). In the present example embodiment, the Interactive class is split into Interactive A and Interactive B—e.g., Interactive A for low rate, time sensitive flows, and Interactive B for regular interactive traffic (such as web browsing), and the Bulk class is split into Bulk A (regular bulk, such as file download), and Bulk B (background bulk, such as operating system updates).

TABLE 5

Boundary Variables vs Classes

| Variables\Classes | Class 1A (Interactive A) | Class 1B (Interactive B) | Class 2 (Streaming) | Class 3A (Bulk A) | Class 3B (Bulk B (Background Bulk)) |
|---|---|---|---|---|---|
| Average Throughput of a Session ($r_s(t)$) | $R_{1A}(t)$ | $R_{1B}(t)$ | $R_2(t)$ | $R_3(t)$ | N/A |
| ON-OFF Ratio ($\rho(t)$) | N/A | N/A | $\rho_2(t)$ | $\rho_3(t)$ | N/A |
| Session Duration ($T_s(t)$) | N/A | ($T_1(t)$) | ($T_2(t)$) | ($T_3(t)$) | N/A |
| Maximum Rate of a measurement interval ($r_{b,max}(t)$) | N/A | N/A | N/A | $R_{max}$ | N/A |

Then, based on the foregoing input variables, the Classification Rules are as follows:

Rule (0) (which may be referred to as the First Sitting Rule):

A data traffic session can be uniquely identified by the foregoing six-tuple Session-Tuple identifier {Source IP, Destination IP, Source port number, Destination port number, Protocol type and a Session ID (SID)}. Once identified, the session is initially classified as Interactive, and as time proceeds, the four-tuple statistical characteristic profile is generated and updated. The Inner-Loop algorithm then determines the traffic classification for the data traffic session. The algorithm is applied to existing data traffic sessions classified in a traffic class higher than Bulk. By way of example, the Inner-Loop Algorithm comprises certain IF-Then rules, as follows:

START Inner-Loop:

At any update time t, $r_a$ and $\Phi^{(4)}=(r_s,T_s,\rho,r_b)$ are updated, and (if possible) $r_{b,max}=\max(r_b's)$ is updated, and the Inner-Loop subsequently operates, as follows:

Rule (1) (which may be referred to as the Average Throughput Rule), as applied for the Interactive, Streaming and Bulk classes is as follows:

if the Average Throughput of a session is in the range for Interactive, the session is considered Interactive; and if the Average Throughput of a session is in the range of Streaming, the session is considered Streaming; and if the Average Throughput of a session is in the range of Bulk, then the session is considered Bulk.

The mathematical expressions for Rule 1, as applied for the Interactive A, Interactive B, Streaming, Bulk A and Bulk B classes, may be expressed as:

IF $r_s(t) \leq R_{1A}(t)$, THEN the session is in Interactive A;

IF $R_{1A}(t) < r_s(t) \leq R_{1B}(t)$, THEN the session is in Interactive B;

IF $R_{1B}(t) < r_s(t) \leq R_2(t)$, THEN the session is in Streaming;

IF $r_s(t) > R_2(t)$, THEN the session is in Bulk A.

According to Rule (2), the classification is not finished until other rules are checked.

Rule (2) (which may be referred to as the Session Duration Rule (for Streaming)): subsequently, IF a session is considered as Interactive, but the session duration is too long and the average throughput is higher than the rate of a real-time like session, THEN the session is classified as Streaming. The mathematical expressions for Rule 2, may be expressed as:

IF $R_{1A}(t) < r_s(t) \leq R_{1B}(t)$ and $T_s(t) > T_1(t)$, THEN the session is classified as Streaming.

Rule (3) (which may be referred to as the ON-OFF Ratio Rule (for Bulk)): also subsequently, IF a session is considered as Interactive or Streaming, but the session duration is too long and its ON-OFF Ratio is too large and the throughput rate is higher than a real-time like session, THEN the session is classified as Bulk A. Further, if a session is in Bulk A, it can be moved to Bulk B, if conditions are met. The mathematical expressions for Rule 3, may be expressed as:

IF $r_s(t) > R_{1A}(t)$ and $T_s(t) > T_2(t)$ and $\rho(t) > \rho_2(t)$, THEN the session is considered to be moved from Interactive or Streaming to Bulk A;

IF $r_s(t) > R_{1A}(t)$ and $T_s(t) > T_3(t)$ and $\rho(t) > \rho_3(t)$, THEN the session is considered to be moved from Interactive or Streaming or Bulk A to Bulk B.

Rule (4) (which may be referred to as the Maximum Throughput Rate Rule (for Bulk)): further, IF a session is not in Bulk, but its maximum throughput rate is higher than the threshold of a peak rate for Bulk, THEN the session is classified as Bulk. The mathematical expressions for Rule 4, may be expressed as:

IF a session is not in Bulk, and $r_{b,max}(t) \geq R_{max}$, THEN the session is classified as Bulk A.

END Inner-Loop:

By way of further example, for the foregoing operations of the Inner-Loop algorithm, except for the Rules (0) and (1), the Rules (2), (3), (4) can be optionally turned on and off. Further, the algorithm will perform the decision-making process for all of the active rules before setting a session classification. The following Table 6 presents a summary of the Inner-Loop algorithm classification rules.

TABLE 6

Classification Rules

| Rule | Class 1A (Interactive 1) | Class 1B (Interactive) | Class 2 (Streaming) | Class 3A (Bulk A) | Class 3B (Background Bulk) |
|---|---|---|---|---|---|
| Rule (0) | | First sitting; measurement | | | |
| Rule (1) | $r_s(t) \leq R_{1A}(t)$ | $R_{1A}(t) < r_s(t) \leq R_{1B}(t)$ | $R_{1B}(t) < r_s(t) \leq R_2(t)$ | $r_s(t) > R_2(t)$ | |
| Rule (2) | | | $R_{1A}(t) < r_s(t) \leq R_{1B}(t)$ and $T_s(t) > T_1(t)$ | | |
| Rule (3) | | | | $r_s(t) > R_{1A}(t)$ and $T_s(t) > T_2(t)$ and $\rho(t) > \rho_2(t)$ | $r_s(t) > R_{1A}(t)$ and $T_s(t) > T_3(t)$ and $\rho(t) > \rho_3(t)$ |
| Rule (4) | | | | The short term throughput volume is larger than a threshold, $r_{b,max}(t) \geq R_{max}$ | |

The following Tables 7, 8, 9 present (i) a mapping of specific traffic types within the Interactive, Streaming and Bulk traffic classes with a respective priority level, (ii) the input variables, and (iii) the output variables (example configuration of Boundary Variable Thresholds), respectively—which are presented for purposes of an example implementation embodiment of the Inner-Loop algorithm via pseudo-code (presented below).

TABLE 7

Mapping of Traffic Types

| Priority | Traffic type | Assigned Priority Value (for demonstration only—actual value subject to implementation) | Comment |
|---|---|---|---|
| 1 | General Interactive or unclassified | 1.0 | A flow session that is being assessed or with certain low rate. Either stayed as 1.0 or assigned another value after assessment. |
| | VOIP like | 1.1 | Low average rate |
| | Web browsing | 1.2 | Medium volume burst with short assessed Session Duration (per definition) |

TABLE 7-continued

Mapping of Traffic Types

| Priority | Traffic type | Assigned Priority Value (for demonstration only—actual value subject to implementation) | Comment |
|---|---|---|---|
| 2 | Unicast video streaming | 2.0 | Medium rate traffic with long Session Duration; Medium ON_Ratio; support a variety of encoding rate per configuration. |
| 3 | General Bulk | 3.0 | Higher average rate; can be further assigned a value higher than 3.0. |
|  | File download | 3.1 | Short period burst with large volume |
|  | Background Bulk with longer silent interval; large size file | 3.2 | ON_Ratio > 0.75 |
|  | Background Bulk with shorter silent interval, e.g., OS update | 3.3 | ON_Ratio > 0.9 |

TABLE 8

Input Variables

| Variable Notation | Name | Description | Format | Comment |
|---|---|---|---|---|
| CLS_Old | Current Priority Value | Determined by last round of decision making | Scalar, defined in Table 7 | Value see Table 7 |
| Ts | Session Duration | The duration of a session at time t | Scalar | |
| Rs | Long term average rate | The LT AVG rate at time t | Scalar | |
| Ro | ONRatio | ON_Ratio at time t | Scalar | |
| Ab | Accumulate Throughput | Accumulate Throughput in KBytes or Kbits | Scalar | |
| CLS_Rate_TH | Run-time Dynamic Rate Thresholds | Including 5 variables, | Vector with 5 elements | Product of vector coefficient $a = [a(1), a(2), a(3), a(4), a(5)]$ and rate vector $[R\_1A, R\_1B, R\_1B\_1, R2, R3]$. This provides dynamic thresholds. Rate vector is configurable. The coefficients are dynamically adjusted by the gateway. |
| CLS_Ts_TH | Run-time Session Duration Thresholds | Including 3 variables | Vector of 3 elements | Product of vector coefficient $b = [b(1), b(2), b(3)]$ and session time vector $[Ts\_th\_1, Ts\_th\_2, Ts\_th\_3]$. This provides dynamic thresholds. Session time vector is configurable. Generally, the coefficients are all 1's. |
| CLS_Ro_TH | Run-time ON Ratio Thresholds | Including 2 variables | Vector of 2 elements | Product of vector coefficient $c = [c(1), c(2)]$ and ON Ratio vector $[Ro\_1, Ro\_2]$. This provides dynamic thresholds. ON Ratio vector is configurable. Generally, the coefficients are all 1's. |
| Ab_Th | Throughput Volume threshold | Including 1 variable | Scalar | configurable |

TABLE 9

Output Variables:
CLS_New (the updated classification for a session, value see Table 7)

| Name | Unit | Value |
|---|---|---|
| R_1A | Kbps | 150 |
| R_1B | Kbps | 1500 |
| R_1B_1 | Kbps | 200 |
| R_2 | Kbps | 1600 |
| R_3 | Kbps | 10,000 |
| Ts_th_1 | Seconds | 30 |
| Ts_th_2 | Seconds | 90 |
| Ts_th_3 | Seconds | 450 |
| RO_1 | NA | 0.75 |
| RO_2 | NA | 0.90 |

The following Table 10 presents an example implementation embodiment of the Inner-Loop algorithm via pseudo-code, based on the foregoing Tables 6-9.

TABLE 10

Inner-Loop Algorithm (pseudo code)

```
Inputs: CLS_Old, Ts, Rs, Ro, Ab, CLS_Rate_TH (5 elements),
CLS_Ts_TH (3 elements), CLS_Ro_TH, Ab_TH
Output: CLS_New
Ts = Ts; Rs = Rs; Ro = Ro; Ab = Ab; Ab_th = Ab_th;
CLS_Old = CLS_Old;
R_1A = CLS_Rate_TH(1,1);
R_1B = CLS_Rate_TH(1,2);
R_1B_1= CLS_Rate_TH(1,3);
R_2 = CLS_Rate_TH(1,4);
R_3 = CLS_Rate_TH(1,5);
Ts_th_1 = CLS_Ts_TH(1,1);
Ts_th_2 = CLS_Ts_TH(1,2);
Ts_th_3 = CLS_Ts_TH(1,3);
RO_1 = CLS_RO_TH(1,1);
RO_2 = CLS_RO_TH(1,2);
if CLS_Old ≥ 3.5 %already Bulk %do nothing
    else if CLS_Old ≥ 3.1 & CLS_Old < 3.4 (Ab ≥ Ab_th*0.1)
       % Rule#3 ON ratio
          if (Ts ≥ Ts_th_2) & (Rs > R_1B_1) & (Ro ≥ RO_1)
             CLS =3.4;
          end
          if (Ts ≥ Ts_th_3) & (Rs > R_1B_1) & (Ro ≥ RO_2)
             CLS = 3.5;
          end
    else if Ts ≥ Ts_th_1
       % Rule#1, throughput rate
          if Rs ≤ R_1A %VOIP
             CLS = 1.1;
          end
          if Rs > R_1A & Rs ≤ R_1B %Interactive
             CLS = 1.2;
          end
          if Rs > R_1B & Rs ≤ R_2
             CLS = 2;
          end
          if Rs >R_2 %bulk
             CLS = 3;
          end
       % Rule#2, session duration
          if (Ts ≥ Ts_th_2) & (Rs > R_1B_1) & (Rs ≤ R_2) %streaming
             CLS = 2;
          end
       % Rule#4, Max Throughput
          if Ab ≥ Ab_th
             CLS =3.1;
          end
       % Rule#3, ON ration
          if (Ts ≥ Ts_th_2) & (Rs > R_1B_1) & (Ro ≥ RO_1)
             CLS = 3.2;
          end
          if (Ts ≥ Ts_th_3) & (Rs > R_1B_1) & (Ro ≥ RO_2)
             CLS = 3.3;
          end
```

TABLE 10-continued

Inner-Loop Algorithm (pseudo code)

```
       else if %Ts < Ts_th_1
          % Rule#4, Max Throughput
             if (Ab ≥ Ab_th) & CLS_Old < 3.4
                CLS = 3.1;
             else if Ts ≥ 1
                CLS = 1;
             end
       end %CLS
end %Ts < T_timeout
CLS_New = CLS;
Return;
```

The foregoing example embodiments for the Inner-Loop algorithm are not intended to limit the approaches of the present invention to the specific four-tuple statistical traffic characterization metrics and respective classification rules. As would be appreciated by one of ordinary skill in the art, alternative algorithms or rules may be employed for the Inner-Loop as may be appropriate to facilitate alternative methods for statistical traffic classifications, for example, based on additional or different statistical data traffic characterization metrics and/or in view of additional or different traffic classes and respective classification boundaries.

According to example embodiments of the Outer-Loop algorithm (e.g., performed at the bandwidth manager), the algorithm functions to determine the classification boundaries. Generally, the purpose for traffic classification (from the resource management point of view) is to reserve a certain amount of bandwidth for a certain amount of high priority traffic such that the QoS for the high priority data traffic is satisfied. In other words, if the amount of high priority traffic is higher than the reserved bandwidth, then the network may not be able to satisfy the required QoS for such high priority traffic. According to example, embodiments, therefore, dynamic boundaries are applied for the traffic classification process in order to dynamically adjust the boundaries for the classification of the high priority traffic to prevent the reserved bandwidth level from being exceeded (where the adjustment of the boundaries shifts relative to a respective priority continuum such that reducing the amount of traffic classified in the high priority class begins with traffic of a lower relative priority within the class and shifts towards traffic of increasing relative priority levels in the class—such that the reserved bandwidth remains available to the traffic of the higher relative priority levels within the class). In other words, when the traffic volume of a high priority class is higher than the reserved bandwidth for that class, the boundary for this traffic class is shifted (the class is tightened) such that fewer sessions are classified in that high priority class. In that regard, because the statistical method is effectively "blind" in the sense that it classifies the traffic without knowledge of the particular application or service of a data traffic session, the sessions close to the boundary between two adjacent classes have a higher likelihood of being classified in either of the two adjacent classes (depending on the current position of the dynamic boundary location), and adjustment of the boundary thereby does not affect the higher priority traffic sessions further away from the boundary, which ensures the satisfaction of the corresponding QoS requirements for such higher priority traffic sessions further away from the boundary.

For the Outer-Loop algorithm, for example, in a satellite network, the network spectrum resources or bandwidth for the forward direction (also referred to as the outroute) differ from the bandwidth for the return direction (also referred to as the inroute) are distinct due to their innate physical layer characteristics—whereby the calculation of bandwidth utilization may be different for the different transmission directions. For example, the outroute practically incurs higher utilization in terms of estimated network capacity while the inroute incurs lower utilization. For the Outer-Loop algorithm, however, the algorithm may still be the same if the capacity of the inroute is discounted to accommodate for the innate lower utilization.

For the outroute direction, the CRO utilization (outroute bandwidth utilization) for various traffic classes may be calculated as follows: (1) if the Bandwidth Manager and multiple CROs are present, then the CRO utilization for a traffic class is based on the overall utilization across CROs; (2) if the Bandwidth Manager is not present, the CRO utilization for a traffic class is based on the result of an individual CRO. For example, suppose there are K CROs with actual utilizations for N class types—let $u_{k,i}$ denote the utilization of the $i^{th}$ class of the $k^{th}$ CRO, i=1, 2, . . . , N where N is the number of classes (e.g., Interactive, Streaming, Bulk, etc.), and k=1, 2, . . . , K where K is the number of CROs in a resource pool (e.g., beam level for a satellite network), and let $C_{k,NRT}$ be the non-real-time (NRT) capacity of the $k^{th}$ CRO.

The overall utilization for each priority class (the $i^{th}$ priority class), $u_{avg,i}$, i=1, 2, . . . , N—where N is the number of traffic classes, and K is the number of CROs in the resource pool—can be expressed as:

$$u_{avg,i} = \frac{\sum_{k=1}^{K} u_{k,i} \cdot C_{k,NRT}}{\sum_{k=1}^{K} C_{k,NRT}}$$

According to the present embodiment, the general concept for the Outer-Loop algorithm is that, (i) if the utilization of Interactive is larger than the portion threshold, then the throughput and session duration boundaries are adjusted between Interactive and Streaming; (ii) if the combined utilization of Interactive and Streaming is larger than the combined threshold portion, then the throughput and ON-OFF Ratio boundaries will be adjusted between Streaming and Bulk.

For the inroute direction, the inroute bandwidth utilization is executed at the Inroute Group level—where an Inroute Group may consist of inroutes of various symbol rates, such as 512 ksps, 1 Msps, 2 Msps, 4 Msps, etc. A terminal may be switched between inroutes so that the bandwidth utilization on each inroute is balanced on a per priority basis and all priorities, which ensures that the utilization of the whole Inroute Group represents the situation of an individual inroute. As mentioned above, however, the spectrum utilization on the inroute is usually lower than that on the outroute. According to one embodiment, therefore, the actual inroute capacity can be discounted by a configurable ratio or percentage (in one embodiment, for example, 20%), in terms of the true capacity that the inroute spectrum can provide using certain modulation and coding schemes. The actual throughput of each priority in an Inroute Group can be collected by the Inroute Group Manager (IGM)—e.g., by calculating the ratio of the actual throughput and the actual estimated capacity, the IGM knows the bandwidth utilization of an Inroute Group. By way of example, denoting IG_Capacity as the estimated capacity (Mbps or kbps) and IG_Throughput(i) as the actual throughput of an Inroute Group for the class i (i=1, 2, . . . , N) (N being the number of traffic classes)—and where $\{u_{IG,i}\}$ and $\{u_{i,TH}^{IG}\}$ are the actual utilization and threshold for $i^{th}$ priority, respectively—these values can be plugged into the Outer-Loop algorithm to perform the dynamic classification boundary adjustments for the inroute direction.

According to one embodiment, the Outer-Loop algorithm is as follows.

According to the present embodiment, a group of coefficients (referred to as Boundary Coefficients) are used, which are denoted as $\{a_i\}$, $\{b_i\}$, $\{c_i\}$, i=1, 2, . . . , N−1, where N is the number of traffic classes. Note that for N traffic classes, only N−1 boundary Coefficients are needed, because there are only N−1 boundaries between the traffic classes. Thus, for the present example of the three Interactive, Streaming and Bulk traffic classes, there are N−1=2 Boundary Coefficients, because there only 2 boundaries. Further, for the present example embodiment, the coefficients as $\{a_i\}$, $\{b_i\}$, $\{c_i\}$ are associated with the boundaries for the Average Throughput, Session Duration and ON-OFF Ratio metrics, respectively. Each Boundary Coefficient further has a corresponding minimum and maximum value, denoted for $\{a_i\}$ as $\{a_{i,min}\}$ and $\{a_{i,max}\}$, for $\{b_i\}$ as $\{b_{i,min}\}$ and $\{b_{i,max}\}$, for $\{c_i\}$ as $\{c_{i,min}\}$ and $\{c_{i,max}\}$. The initial value for each coefficient is set to the respective maximum value, and the adjustment of a boundary is realized by increasing or decreasing the respective coefficient.

According to the present embodiment, the Outer-Loop algorithm operates as follows, where $\Delta_x^{down}$ is the down step-size for the respective coefficient (step-size for decrease of the coefficient, x=a, b, c) and where $\Delta_x^{Up}$ is the up step-size for the respective coefficient (step-size for increase of the coefficient, x=a, b, c):

START Outer-Loop:

For Class 1 (Interactive):

IF $u_{avg,1} > u_{1,TH}^{CRO}(1+\delta_1)$, THEN $\alpha_1(t)=\max[\alpha_{1,min}, \alpha_1(t-_1)*(1-\Delta_a^{Down})]$, reducing $\alpha_1$ to tighten the Average Throughput boundary between the Interactive/Streaming classes (e.g., effectively shifting Interactive classifications within a margin of the Average Throughput boundary to the Streaming class);

IF $\alpha_1(t) \leq \lambda_1 \cdot \alpha_{1,min}$, THEN $b_1(t)=\max[b_{1,min}, b_1(t-1)*(1-\Delta_b^{Down})]$ reducing $b_1$ to tighten the Session Duration boundary between the Interactive/Streaming classes (e.g., effectively shifting Interactive classifications within a margin of the Session Duration boundary to the Streaming class);

ELSE IF $u_{avg,1} < u_{1,TH}^{CRO}(1-\delta_1)$, THEN $\alpha_1(t)=\min[\alpha_{1,max}, a_1(t-1)*(1+\Delta_a^{Up})]$, increasing $\alpha_1$ to loosen the Average Throughput boundary between the Interactive/Streaming classes (e.g., effectively shifting Streaming classifications within a margin of the Average Throughput boundary to the Interactive class); and $b_1(t)=\min[b_{1,max}, b_1(t-1)*(1+\Delta_b^{Up})]$, increasing $b_1$ to loosen the Session Duration boundary between the Interactive/Streaming classes (e.g., effectively shifting Streaming classifications within a margin of the Session Duration boundary to the Interactive class);

ELSE $\alpha_1(t)=\alpha_1(t-1)$, in this case $[u_{1,TH}^{CRO}(1-\delta_1) \leq u_{avg,1} \leq u_{1,TH}^{CRO}(1+\delta_1)]$ and the Average Throughput boundary between the Interactive/Streaming classes is held constant.

For Class 2 (Streaming):

IF $\sum_{i=1}^{2} u_{avg,i} > (\sum_{i=1}^{2} u_{i,TH}^{CRO})(1+\delta)$, THEN $\alpha_2(t)=\max[\alpha_{2,min}, \alpha_2(t-1)*(1-\Delta_a^{Down})]$ reducing $\alpha_2$ to tighten the Average Throughput boundary between the Streaming/Bulk classes (e.g., effectively shifting Streaming classifications within a margin of the Average Throughput boundary to the Bulk class);

IF $\alpha_2(t) \leq \lambda \cdot \alpha_{2,min}$ (e.g., the Average Throughput boundary is lower than a threshold), THEN $c_2(t) = \max[c_{2,min}, c_2(t-1)*(1-\Delta_c^{Down})]$, reducing $c_2$ to tighten the ON-OFF Ratio boundary between the Streaming/Bulk classes (e.g., effectively shifting Streaming classifications within a margin of the ON-OFF Ratio boundary to the Bulk class);

Else IF $\Sigma_{i=1}^2 u_{avg,i} < (\Sigma_{i=1}^2 u_{i,TH}^{CRO})(1-\delta)$, THEN $\alpha_2(t) = \min[\alpha_{2,max}, \alpha_2(t-1)*(1+\Delta_\alpha^{Up})]$, increasing $\alpha_2$ to loosen the Average Throughput boundary between the Streaming/Bulk classes (e.g., effectively shifting Bulk classifications within a margin of the Average Throughput boundary to the Streaming class); and $c_2(t) = \min[c_{2,max}, c_2(t-1)*(1+\Delta_c^{Up})]$, increasing $c_2$ to loosen the ON-OFF Ratio boundary between the Streaming/Bulk classes (e.g., effectively shifting Bulk classifications within a margin of the ON-OFF Ratio boundary to the Streaming class);

ELSE $\alpha_2(t) = \alpha_2(t-1)$, the Average Throughput boundary between the Streaming/Bulk classes is held constant.

END Outer-Loop:

For this example embodiment of the Outer-Loop algorithm, the algorithm may end after the 2 iterative steps for the Interactive and Streaming classes. As would be appreciated by one of ordinary skill in the art, however, alternative algorithms may be applied for the Outer-Loop as may be appropriate to facilitate additional or alternative functions of shifting the respective class boundaries for the corresponding statistical traffic profile metrics, for example, based on additional or different statistical traffic profile metrics and/or in view of differing network conditions.

According to a further example embodiment, generic mathematical expressions for the Outer-Loop algorithm for the Average Throughput boundaries (for the traffic class h) may be expressed as follows:

IF $\Sigma_{i=1}^h u_{avg,i} > (\Sigma_{i=1}^h u_{i,TH}^{CRO})(1+\delta)$, THEN $\alpha_h(t) = \max[\alpha_{h,min}, \alpha_h(t-1)*(1-\Delta_\alpha)]$, reducing $\alpha_h$ to tighten the Average Throughput boundary for the respective classes;

Else IF $\Sigma_{i=1}^h u_{avg,i} < (\Sigma_{i=1}^h u_{i,TH}^{CRO})(1-\delta)$, THEN $\alpha_h(t) = \min[\alpha_{h,max}, \alpha_h(t-1)*(1-\Delta_\alpha)]$, increasing $\alpha_h$ to loosen the Average Throughput boundary for the respective classes Else $\alpha_h(t) = \alpha_h(t-1)$ The following Table 11 presents an example implementation embodiment of the Outer-Loop algorithm via pseudo-code.

TABLE 11

Outer-Loop Algorithm (pseudo code)

U1 = Configured utilization weight for Priority 1
U2 = Configured utilization weight for Priority 2
U12 = U1+U2
Util_C1(t) = AVG utilization of Priority 1 at time t
Util_C12(t) = AVG utilization of Priorities 1 and 2 at time t
a_min = [a_min(1), a_min(2), ..., a_min(5)], pre-configured.
a(t): 5-element vector
T_outer_loop: timer of outer loop
step_up: 5-element vector for upstep size
step_down: 5-element vector for downstep size
In this version, only a(2), a(3), a(4) are adjusted - a(1), a(5), b(i)'s and c(j)'s all remain constant (meaning the value is 1).
For every period of T_outer_loop, the Bandwidth Manager (or CRO) runs the following:

TABLE 11-continued

Outer-Loop Algorithm (pseudo code)

% for Rate Boundary 1
  if Util_C1 < U1*(1-tolerance)
    a(2,t) = min(a_max, a(2,t-1)*(1+step_up(1,2)));
    a(3,t) = min(a_max, a(3,t-1)*(1+step_up(1,3)));
  else if Util_C1 > U1*(1+tolerance)
    a(2,t) = max(a_min(1,2), a(2,t-1)*(1-step_down(1,2)));
    a(3,t) = max(a_min(1,3), a(3,t-1)*(1-step_down(1,3)));
  else
    a(2:3,t) = a(2:3,t-1);
  end
end
% for Rate boundary 2
U12=U1+U2;
  if Util_C12 < U12*(1-tolerance)
    a(4,t) = min(a_max, a(4,t-1)*(1+step_up(1,4)));
  else if Util_C12 > U12*(1+tolerance)
    a(4,t) = max(a_min(1,4), a(4,t-1)*(1-step_down(1,4)));
  else
    a(4,t) = a(4,t-1);
  end
end According to example embodiments, the Boundary Coefficients (e.g., $\{a_i\}$, $\{b_i\}$, $\{c_i\}$, i=1, 2, ..., N-1, where N=3 for the classes Interactive, Streaming, Bulk) can be derived by the bandwidth manager, passed to the IP Gateway (IPGW), and then transmitted to the terminal by the IPGW either periodically or as needed—e.g., if there is no change in the coefficients for a period, then no update is provided to the terminal. By way of example, the update period, denoted as $T_{P1}$, referred to as Period 1, may have a default value of $T_{P1}=2$ seconds. When the IPGW passes the coefficients to terminals, it may use two timers, $T_{P1}$ and $T_{P2}$ (Periods 1 and 2)—whereby, if there is a change in the coefficients, then the $T_{P1}$ period is used, otherwise, the period $T_{P2}$ is used (with a default value, for example, of $T_{P2}=10$ seconds). The terminal will use the most recent updated coefficient values—where, if there is no value received for a time period of $K*T_{P2}$ (e.g., K=3), then the default coefficient values will be used.

The following Table 12 presents a summary of the Boundary Coefficients of the foregoing example embodiment for the Outer-Loop algorithm.

TABLE 12

Boundary Coefficients

| Notation | Name | Initial value | Comment | Path |
|---|---|---|---|---|
| $\{a_i\}$ | Boundary Coefficient for Average Throughput | $\{a_i = 1\}$ at time t = 0 | Parameters are passed to terminals by the IPGW periodically or as needed. Updated by BM or CRO. | From IPGW to terminals |
| $\{b_i\}$ | Boundary Coefficient for Session Duration | $\{b_i = 1\}$ at time t = 0 | Same as above. | From IPGW to terminals |
| $\{c_i\}$ | Boundary Coefficient for ON Ratio | $\{c_i = 1\}$ at time t = 0 | Same as above. | From IPGW to terminals |
| Step_up(i) | Upstep size for a(i) | Configured as [0.05, 0.05, 0.05 0.05, 0.05] | In Outer-Loop | At the Bandwidth Manager |
| Step_down(i) | Downstep size for a(i) | Configured as [0.07, 0.07, 0.07 0.07, 0.07] | In Outer-Loop | At the Bandwidth Manager |

In further accordance with example embodiments, for each session, the classification process is executed once a session is established and identified by the gateway or the IP gateway (IPGW) and the terminal. By way of example, for the return or reverse direction (the inroute) the terminal analyzes the data traffic and determines or captures the statistical profile for the session, and classifies the session based on the determined statistical profile—e.g., the terminal performs the initial classification, and periodically updates the classification based on changes in the statistical profile and adjustments of the class boundaries over time. By way of further example, for the forward direction (the outroute), the statistical profile of a session may be different as observed at the IPGW and the terminal. This is because spoofing, queueing and scheduling operations at the IPGW may alter the arrival pattern of the incoming data traffic.

As specified above, the four-tuple characteristic profile $\Phi^{(4)}=(r_r, T_s, \rho, r_b)$ is used to characterize a runtime session, where $r_s$ is the Average Throughput, $T_s$ is the Session Duration, $\rho$ is the ON-OFF Ratio, and $r_b$ is the maximum measured throughput rate. As such, for the forward direction, $r_s$ and $T_s$ should be the same for the IPGW and the terminal when the initial classification (the first sitting) is Interactive and is subsequently classified in a certain class. The behavior of $\rho$, however may differ at the IPGW and at the terminal. According to certain example embodiments as presented above, the ON-OFF Ratio $\rho$ is used for differentiation between Streaming and Bulk (e.g., as compared to an expected pattern of data traffic as received at the IPGW)—this ratio, however, may exhibit a different pattern at the terminal than as when arriving at the IPGW, and thus it may be inaccurate for the terminal to distinguish/classify between Streaming and Bulk. Further, according to certain example embodiments as presented above, $r_b$ is mainly used for determining Bulk—and, while it is expected that $r_b$ may be seen differently at the terminal and at the IPGW, considering its larger scale for Bulk, applying $r_b$ at the terminal may still achieve a similar performance as at the IPGW.

In view of the foregoing, according to example embodiments, a combination approach can be employed, applying the statistical classification process at both the IPGW and the client terminal. By way of example, for the forward or outroute direction, the classification process can be employed at the IPGW, whereas, for the return or inroute direction, the classification process can be employed at the client terminal. In this regard, for the outroute, the IPGW runs both the inner and outer loops of the classification process. Whereas, for the inroute, the inroute group manager (IGM) or bandwidth manager (BM) at the gateway/IPGW performs the outer loop, determining/updating the Boundary Coefficients (e.g., $\{a_i\}$, $\{b_i\}$, $\{c_i\}$, i=1, 2, . . . , N−1, where N=3 for the classes Interactive, Streaming, Bulk), and provides or transmits the coefficients to all terminals. Each terminal then determines the respective inroute boundary variables based on the provided coefficients, and performs the Inner-Loop classification process to determine/update the session classifications. The gateway period for updating and transmitting the boundary coefficients should be the same or sooner than the update period applied by the terminals. One potential drawback associated with this combo approach is that the gateway/IPGW may need to maintain a large number of statistical profiles for all the terminals that are associated with or serviced by the gateway/IPGW.

According to further example embodiments, the statistical classification process for both the inroute and outroute directions are implemented at the terminal. By way of example, for the inroute, the Outer-Loop algorithm will be performed by the IGM or BM at the gateway/IPGW—whereas, for the outroute direction, the Outer-Loop algorithm is implemented at the IPGW. By way of further example, with this approach, IGM/IPGW send the corresponding inroute and outroute Boundary Coefficients to the respective associated terminals—and, upon receiving the Boundary Coefficients, the terminal applies them to calculate the respective inroute and outroute boundary variables, and also performs respective Inner-Loop classification algorithms for the inroute and outroute data traffic sessions, respectively.

Figure 4:
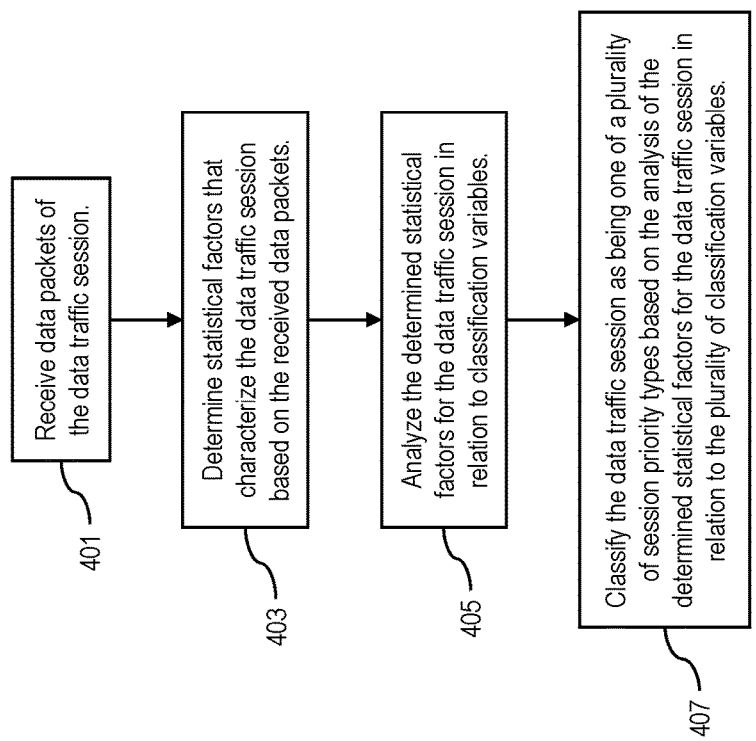
FIG. 4 illustrates a flow chart depicting a process for data traffic classification that employs a rule-based statistical classification method that can be adaptively tuned according to network conditions, in accordance with example embodiments of the present invention.

FIG. 4 illustrates a flow chart depicting a process for data traffic classification that employs a rule-based statistical classification method that can be adaptively tuned according to network conditions—in accordance with example embodiments of the present invention. In step 401, a plurality of data packets of a data traffic session are received. In step 403, a plurality of statistical factors that characterize the data traffic session based on the received data packets of the data traffic session are determined. In step 405, the determined statistical factors for the data traffic session are analyzed in relation to a plurality of classification variables. In step 407, the data traffic session is classified as being one of a plurality of session priority types based on the analysis of the determined statistical factors for the data traffic session in relation to the plurality of classification variables. Wherein each of a plurality of subsets of the classification variables delineates the plurality of session priority types over a continuum with respect to a corresponding one of the statistical factors.

Figure 5:
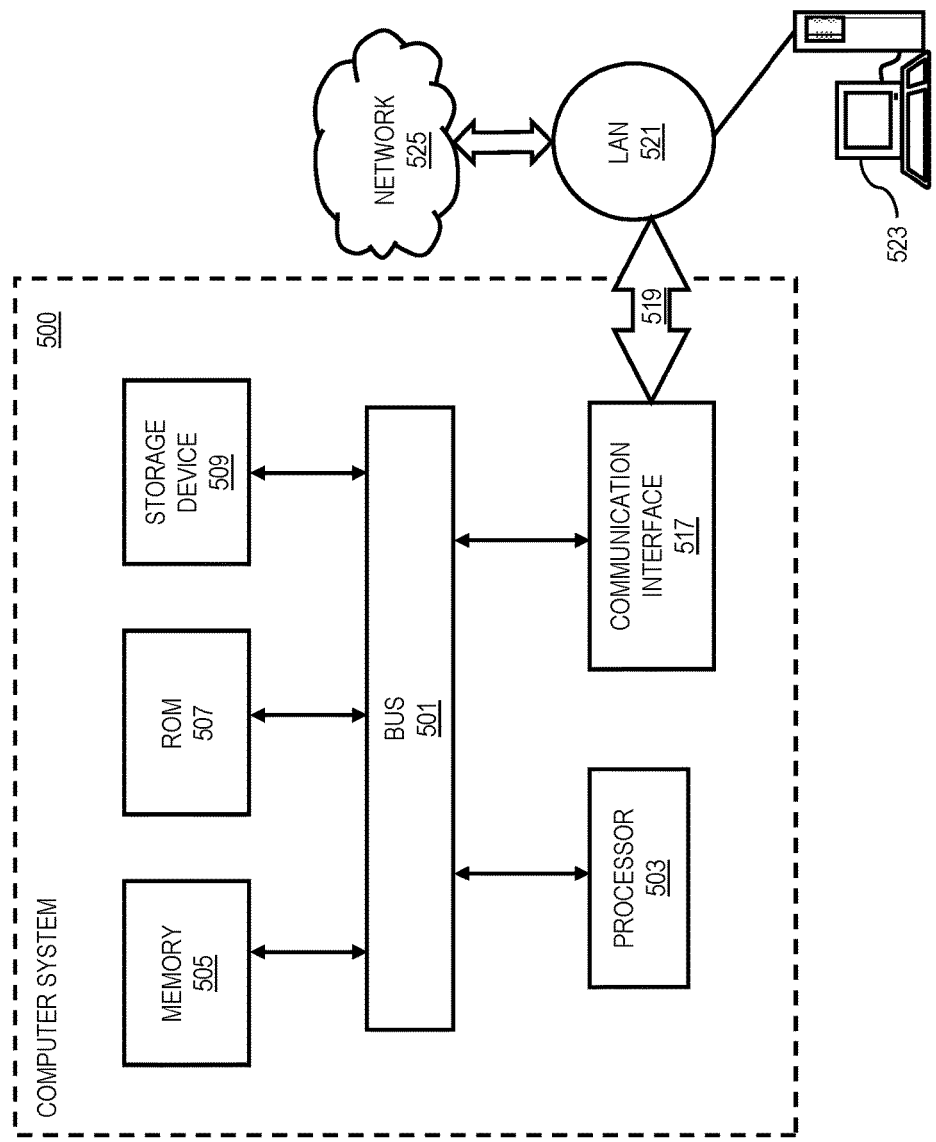
FIG. 5 illustrates a computer system upon which example embodiments according to the present invention can be implemented.

FIG. 5 illustrates a computer system 500 upon which example embodiments according to the present invention can be implemented. The computer system 500 includes a bus 501 or other communication mechanism for communicating information, and a processor 503 coupled to the bus 501 for processing information. The computer system 500 also includes memory 505, such as a random access memory (RAM) or other dynamic storage device, coupled to the bus 501 for storing information and instructions to be executed by the processor 503. The memory 505 can also be used for storing temporary variables or other intermediate information during execution of instructions to be executed by the processor 503. The computer system 500 further includes a read only memory (ROM) 507 or other static storage device coupled to the bus 501 for storing static information and instructions for the processor 503. A storage device 509, such as a magnetic disk or optical disk, may also be coupled to the bus 501 for storing information and instructions.

According to one embodiment, approaches for session data traffic classification via a rule-based statistical classification method, which can be adaptively tuned according to network conditions, may be implemented by the computer system 500 in response to the processor 503 executing an arrangement of instructions contained in the memory 505. Such instructions can be read into main memory 505 from another computer-readable medium, such as the storage device 509. Execution of the arrangement of instructions contained in memory 505 causes the processor 503 to perform the process steps described herein. One or more processors in a multi-processing arrangement may also be employed to execute the instructions contained in memory 505. In alternative embodiments, hard-wired circuitry is used in place of or in combination with software instructions to implement the embodiment of the present invention.

Thus, embodiments of the present invention are not limited to any specific combination of hardware circuitry and software.

The computer system 500 may further include a communication interface 517 coupled to bus 501. The communication interface 517 provides a two-way data communication coupling to a network link 519 connected to a network (e.g., LAN) 521. For example, the communication interface 517 may be a digital subscriber line (DSL) card or modem, an integrated services digital network (ISDN) card, or other modem or communications interface for providing a data communication connection to the network 521. As another example, communication interface 517 may be a local area network (LAN) card (e.g. for Ethernet™ or an Asynchronous Transfer Mode (ATM) network) to provide a data communication connection to a compatible LAN. Further, wireless links can also be implemented. Further, the communication interface 517, for example, includes peripheral interface devices, such as a Universal Serial Bus (USB) interface, a PCMCIA (Personal Computer Memory Card International Association) interface, etc. (not shown).

The network link 519 typically provides data communication through one or more networks to other data devices. For example, the network link 519 provides a connection through local network 521 to a host computer 523, and has connectivity to a network 525 (e.g. a wide area network (WAN) or the global packet data communication network (e.g., the "Internet") or to data equipment operated by service provider.

The computer system 500 sends messages and receives data, including program code, through the network(s), network link 519, and communication interface 517. In the Internet example, a server (not shown) might transmit requested code belonging to an application program for implementing an embodiment of the present invention through the network 525, local network 521 and communication interface 517. The processor 503 executes the transmitted code while being received and/or store the code in storage device 509, or other non-volatile storage for later execution.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While example embodiments of the present invention may provide for various implementations (e.g., including hardware, firmware and/or software components), and all functions may be performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for classification of a data traffic session over a data communications network, comprising:

receiving, by a network device of the data communications network, a plurality of data packets of the data traffic session;

determining, by the network device, a plurality of statistical factors that characterize the data traffic session based on the received data packets of the data traffic session;

analyzing, by the network device, the determined statistical factors for the data traffic session in relation to a plurality of classification variables; and classifying, by the network device, the data traffic session as being one of a plurality of data traffic types/classes based on the analysis of the determined statistical factors for the data traffic session in relation to the plurality of classification variables; and wherein each of a plurality of subsets of the classification variables reflect boundaries that delineate the plurality of data traffic types/classes over a continuum with respect to a corresponding one of the statistical factors.

2. The method according to claim 1, wherein the plurality of statistical factors comprise metrics or factors that are identifiable by one or more of data extracted from the received data packets and a determination of characteristics exhibited by the received data packets, and that reflect or indicate a data traffic or priority type of the respective data traffic session.

3. The method according to claim 1, wherein the plurality of statistical factors comprise one or more of Average Throughput, Maximum Throughput, Session Duration, ON-Duration, OFF-Duration, ON-OFF Ratio, Average ON-Duration, Average OFF-Duration, and Volume, wherein the Average Throughput is a throughput rate over a time period from a start of the data traffic session to a time that the throughput rate is determined, the Maximum Throughput is a highest throughput rate measured during a respective sampling period of the data traffic session, the Session Duration is a time duration from the start of the data traffic session to a most recent state update, the ON-Duration is an accumulated time during which data packets are received over the Session Duration, the OFF-Duration is an accumulated time during which the data packets are not received over the Session Duration, ON-OFF ration is a ratio of the ON-Duration and OFF-Duration, Average ON-Duration is an average of ON time over the Session Duration, Average OFF-Duration is an average of OFF time over the Session Duration, and Volume is a volume of data packets received over a respective time period.

4. The method according to claim 1, wherein each classification variable of each of the plurality of subsets reflects a threshold between two respective data traffic types/classes with respect to the corresponding statistical factor.

5. The method according to claim 1, further comprising:
modifying one or more of the classification variables of each of one or more of the plurality of subsets, based on one or more traffic conditions of the data communications network, to adjust the respective boundaries that delineate the plurality of data traffic types/classes over the continuum with respect to the corresponding one of the statistical factors.

6. The method according to claim 5, wherein the one or more traffic conditions of the data communications network include one or more of bandwidth utilization within each of the data traffic types/classes, bandwidth allocation to each of the data traffic types/classes and network congestion.

7. The method according to claim 5, wherein the one or more of the classification variables of each of one or more of the plurality of subsets are modified on a periodic basis.

8. The method according to claim 5, wherein the one or more of the classification variables of each of one or more of the plurality of subsets are modified in order to dynamically adjust the respective boundaries for one or more data traffic types/classes of higher priority than other of the data traffic types/classes to prevent a respective reserved bandwidth level for each of the one or more data traffic types/classes of higher priority from being exceeded.

9. The method according to claim 1, further comprising:
determining a unique session ID for the data traffic session based one or more identification factors including one or more of source address, source port number, destination address, destination port number and protocol type.

10. A network apparatus for classification of a data traffic session over a data communications network, comprising:
a receiver configured to receive a plurality of data packets of the data traffic session; and
one or more processors configured to (i) determine a plurality of statistical factors that characterize the data traffic session based on the received data packets of the data traffic session, (ii) analyze the determined statistical factors for the data traffic session in relation to a plurality of classification variables, and (iii) classify the data traffic session as being one of a plurality of data traffic types/classes based on the analysis of the determined statistical factors for the data traffic session in relation to the plurality of classification variables; and
wherein each of a plurality of subsets of the classification variables reflect boundaries that delineate the plurality of data traffic types/classes over a continuum with respect to a corresponding one of the statistical factors.

11. The network apparatus according to claim 10, wherein the plurality of statistical factors comprise metrics or factors that are identifiable by one or more of data extracted from the received data packets and a determination of characteristics exhibited by the received data packets, and that reflect or indicate a data traffic or priority type of the respective data traffic session.

12. The network apparatus according to claim 10, wherein the plurality of statistical factors comprise one or more of Average Throughput, Maximum Throughput, Session Duration, ON-Duration, OFF-Duration, ON-OFF Ratio, Average ON-Duration, Average OFF-Duration, and Volume, wherein the Average Throughput is a throughput rate over a time period from a start of the data traffic session to a time that the throughput rate is determined, the Maximum Throughput is a highest throughput rate measured during a respective sampling period of the data traffic session, the Session Duration is a time duration from the start of the data traffic session to a most recent state update, the ON-Duration is an accumulated time during which data packets are received over the Session Duration, the OFF-Duration is an accumulated time during which the data packets are not received over the Session Duration, ON-OFF ration is a ratio of the ON-Duration and OFF-Duration, Average ON-Duration is an average of ON time over the Session Duration, Average OFF-Duration is an average of OFF time over the Session Duration, and Volume is a volume of data packets received over a respective time period.

13. The network apparatus according to claim 10, wherein each classification variable of each of the plurality of subsets reflects a threshold between two respective data traffic types/classes with respect to the corresponding statistical factor.

14. The network apparatus according to claim 10, wherein the one or more processors is/are further configured to modify one or more of the classification variables of each of one or more of the plurality of subsets, based on one or more traffic conditions of the data communications network, to adjust the respective boundaries that delineate the plurality of data traffic types/classes over the continuum with respect to the corresponding one of the statistical factors.

15. The network apparatus according to claim 14, wherein the one or more traffic conditions of the data communications network include one or more of bandwidth utilization within each of the data traffic types/classes, bandwidth allocation to each of the data traffic types/classes and network congestion.

16. The network apparatus according to claim 14, wherein the one or more processors is/are configured to modify the one or more of the classification variables of each of one or more of the plurality of subsets are modified on a periodic basis.

17. The network apparatus according to claim 14, wherein the one or more of the classification variables of each of one or more of the plurality of subsets are modified in order to dynamically adjust the respective boundaries for one or more data traffic types/classes of higher priority than other of the data traffic types/classes to prevent a respective reserved bandwidth level for each of the one or more data traffic types/classes of higher priority from being exceeded.

18. The network apparatus according to claim 10, wherein the one or more processors is/are further configured to determine a unique session ID for the data traffic session based one or more identification factors including one or more of source address, source port number, destination address, destination port number and protocol type.

* * * * *